US009061762B2

(12) United States Patent
Vetter

(10) Patent No.: US 9,061,762 B2
(45) Date of Patent: Jun. 23, 2015

(54) MULTI-ORIENTATION, ADVANCED VERTICAL AGILITY, VARIABLE-ENVIRONMENT VEHICLE

(71) Applicant: James W Vetter, Portola Valley, CA (US)

(72) Inventor: James W Vetter, Portola Valley, CA (US)

(*) Notice: Subject to any disclaimer, the term of this patent is extended or adjusted under 35 U.S.C. 154(b) by 176 days.

(21) Appl. No.: 13/914,120

(22) Filed: Jun. 10, 2013

(65) Prior Publication Data

US 2014/0021291 A1 Jan. 23, 2014

Related U.S. Application Data

(60) Provisional application No. 61/658,366, filed on Jun. 11, 2012.

(51) Int. Cl.
*B64C 27/00* (2006.01)
*B64C 39/00* (2006.01)
*B63H 1/34* (2006.01)

(52) U.S. Cl.
CPC ............... *B64C 39/003* (2013.01); *B63H 1/34* (2013.01); *B63H 2001/346* (2013.01)

(58) Field of Classification Search
USPC ........................... 244/19, 20, 21, 70; 114/337
See application file for complete search history.

(56) References Cited

U.S. PATENT DOCUMENTS

| 1,656,492 | A | | 1/1928 | Moineau |
| 2,413,460 | A | | 12/1946 | Main |
| 3,801,047 | A | | 4/1974 | Dell'Aquila |
| 4,113,205 | A | * | 9/1978 | Shaw ............................... 244/20 |
| 4,128,073 | A | | 12/1978 | Rossmann |
| 4,166,595 | A | * | 9/1979 | Ango .............................. 244/20 |
| 4,194,707 | A | | 3/1980 | Sharpe |
| 4,846,091 | A | | 7/1989 | Ives |
| 5,100,080 | A | * | 3/1992 | Servanty .......................... 244/9 |
| 5,265,827 | A | | 11/1993 | Gerhardt |
| 5,462,406 | A | | 10/1995 | Ridgewell et al. |
| 6,007,021 | A | | 12/1999 | Tsepenyuk |
| 6,016,992 | A | | 1/2000 | Kolacny |
| 6,231,004 | B1 | | 5/2001 | Peebles |
| 6,352,219 | B1 | | 3/2002 | Zelic |
| 6,932,296 | B2 | | 8/2005 | Tierney |
| 7,219,854 | B2 | | 5/2007 | Boschma, Jr. et al. |

(Continued)

FOREIGN PATENT DOCUMENTS

WO 2005/047100 A1 5/2005

OTHER PUBLICATIONS

International Search Report and Written Opinion of the International Searching Authority of Nov. 8, 2013 in related PCT application PCT/US2013/044956.

*Primary Examiner* — J. Woodrow Eldred
(74) *Attorney, Agent, or Firm* — Young Law Firm, P.C.

(57) ABSTRACT

A vertical takeoff and landing craft that utilizes lifting, propulsion and maneuvering (LPM) assemblies comprising a series of blade foils arranged along track elongated loop paths disposed at the sides of a fuselage. These LPM assemblies are provided with control mechanisms enabling lift, attitude changes, altitude changes and directional flight propulsion and control including those needed for hovering as well as vertical takeoff and landing. The LPM assemblies are configured to drive large volumes of air in a manner and scale favorably similar to conventional rotorcraft while in contrast, providing capability for faster flights by eliminating or minimizing speed limiting factors commonly associated with rotorcraft.

33 Claims, 35 Drawing Sheets

(56) References Cited

U.S. PATENT DOCUMENTS

| | | |
|---|---|---|
| 7,264,202 B2 | 9/2007 | Sullivan |
| 7,370,828 B2 | 5/2008 | Stephens |
| 7,735,773 B2 | 6/2010 | Schwaiger |
| 2010/0317244 A1 | 12/2010 | Jacobsen et al. |

\* cited by examiner

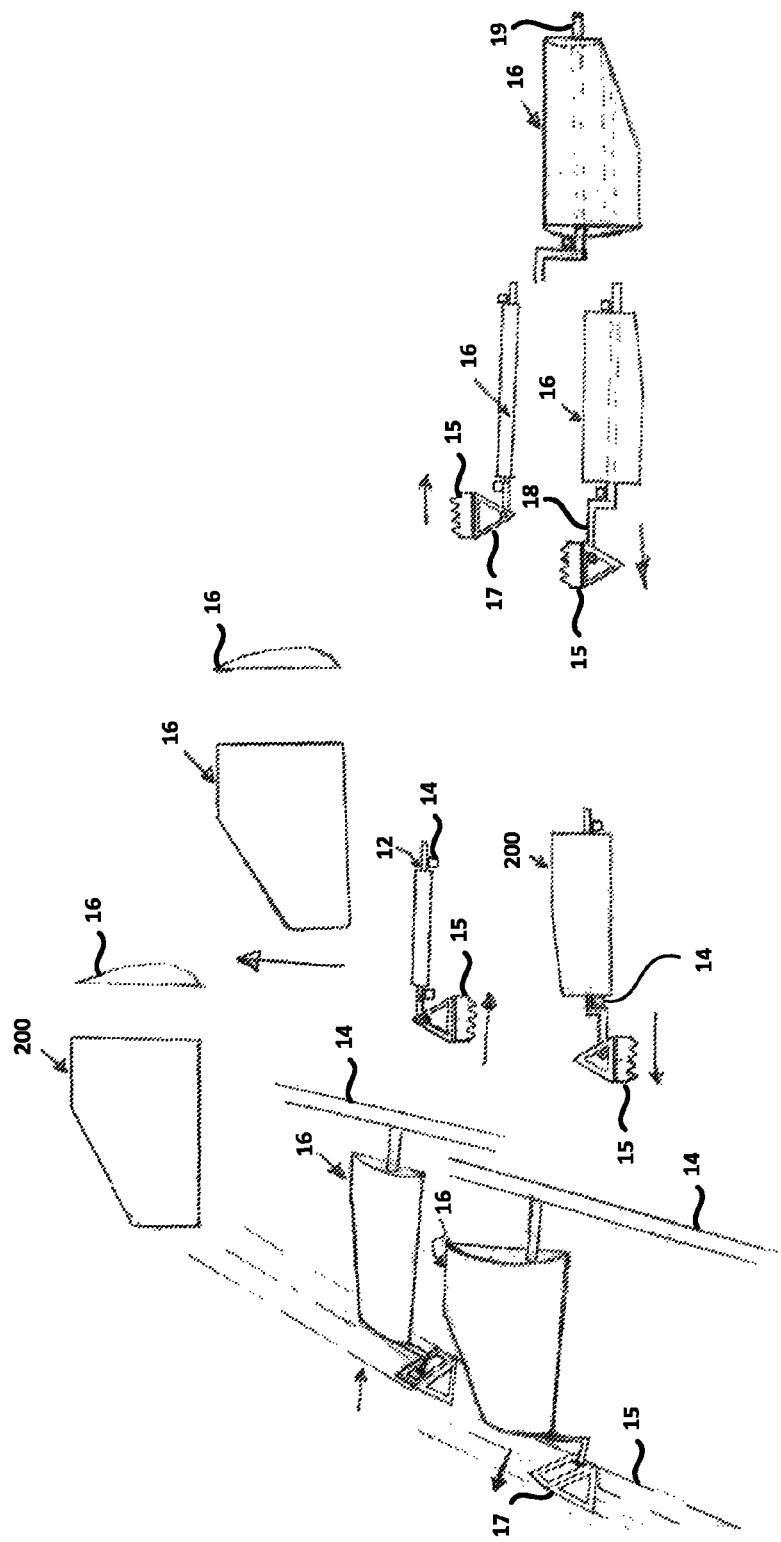

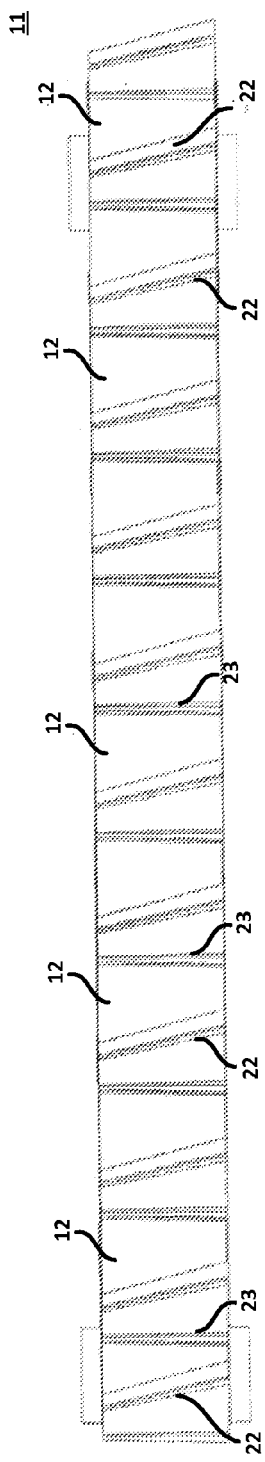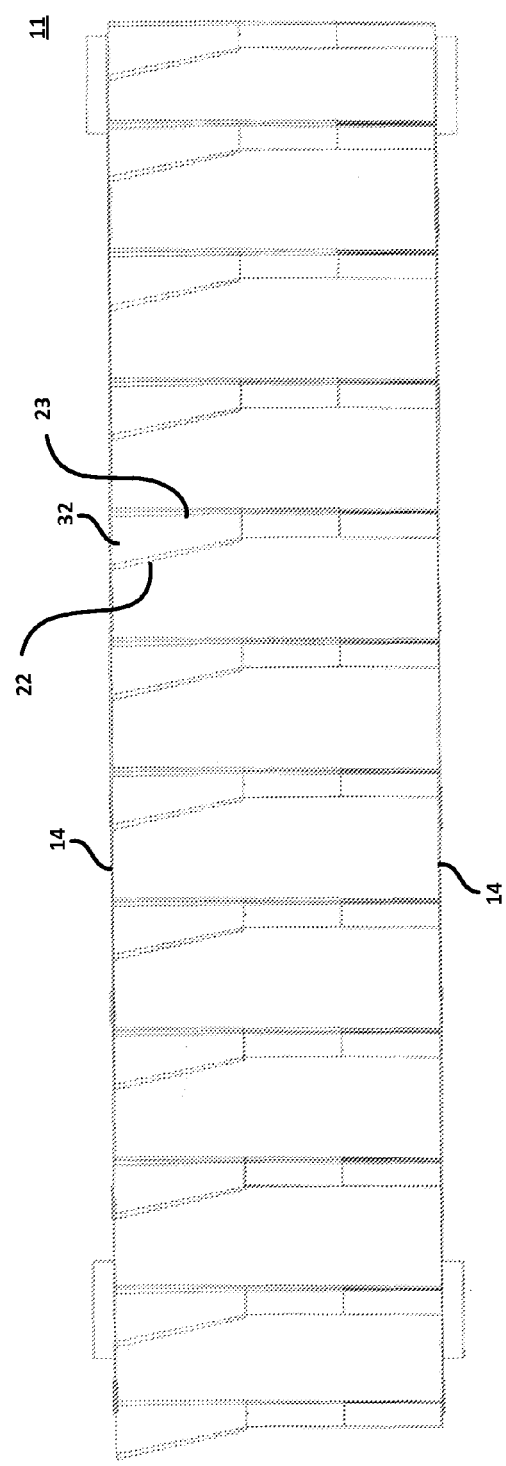

MULTI-ORIENTATION, ADVANCED VERTICAL AGILITY, VARIABLE-ENVIRONMENT VEHICLE

BACKGROUND

Embodiments are in the field of air, sea and land vehicles. More particularly, embodiments are in the field of vertical take-off and landing vehicles. More particularly still, embodiments are directed towards vehicles combining the mass flow generating capabilities of rotorcraft for hover and low speed load carrying capabilities with the speed, range and altitude capabilities of high speed fixed wing craft.

SUMMARY

One embodiment comprises a craft comprising a fuselage flanked by lifting, propulsion and maneuvering units (LPM assemblies). Components of each of the LPM assemblies may comprise a plurality of individual discrete wing blades or airfoils (hereafter, "blade foil" or "blade foils") arranged about an elongated loop path set on edge. According to one embodiment, such blade foils cycle around the elongated loop path in a longitudinal and vertical plane, to produce desired forces for lifting, propulsion and maneuvering. A control assembly enables blade foils to attain high-flow angles of attack such that all needed lift, maneuverability, attitude changes, stability, altitude changes and propulsion may be provided solely by the blade foils. According to one embodiment, the control assembly enables the blade foils to achieve functional high-flow angles of attack at all or substantially all points along the elongated loop path and to maintain desirable blade foil angles with respect to relative flow, including the extreme ends of the elongated loop paths. In such an embodiment, while moving the blade foils from back to front on the top portion of the elongated loop path and following around to the bottom portion of the elongated loop path, then from front to back, pitch angles and chord lengths may be selected top relative to bottom to achieve lift, forward flight and aft flight as well as directional changes, across a range speeds and strengths. In one embodiment, the lower surfaces of the blade foils are maintained as the lower surfaces continuously and throughout the entire cycle around elongated loop path. Likewise, the top surfaces of the blade foils are maintained as the top surfaces (meaning the top surfaces face upwards) throughout their entire path around the elongated loop path. In this manner, all needed forces may be solely and completely provided simply by controlling power to the blade foils and the pitch angles of an individual blade foil or collective thereof blade foils as they are moved around the elongated loop path.

According to one embodiment, if the pitch angles of the blade foils on the top portion of the elongated loop path are controlled to assume a shallow pitch angle, and the pitch angles of the blade foils traveling along the bottom path of the elongated loop path are moved to a more coarse or steep pitch angle, (meaning closer to a perpendicular angle relative to their direction of travel, front to back), then the craft would move forward, assuming the LPM assemblies on each side of the craft were cycling around their elongated loop paths at the same speeds with the same pitch combinations. Any variation, side to side, and/or top to bottom of each LPM assembly, effectively changes attitude, horizontal and vertical maneuvers and/or speed in all directions and combinations about the three x, y and z axes. According to one embodiment, assuming that the cycling speeds around the elongated loop paths are sufficient to generate more lift than the weight of the craft, which may according to embodiments include lighter than air components to provide a degree of lifting force, and assuming that the angles of pitch and combined surface areas of the blade foils are likewise sufficient to produce that lift, then such a craft would rise in altitude. If the elongated loop path on the starboard side of such a craft were given more power and a higher speed of revolution relative to the elongated loop path on the port side of the craft, or more pitch, aggregate blade foil surface area or some combination thereof, then the craft would tend to bank to port and also turn to port (rotate in the vertical plane to port). According to one embodiment, if a certain section including a plurality of blade foils were given a coarser or steeper pitch relative to another or other section(s) along an LPM assembly, then that section of the LPM assembly and the portion of the fuselage nearest that section would both be lifted upwards and propelled in a direction opposite the direction of travel of the blade foils whose pitch has been steepened. In this manner, multiple attitudes and a continuum of combinations of lift, direction of travel and attitude may be controlled using simple pitch changes in a sub-region (a region smaller than an entire top or bottom of a elongated loop path) combined with changes in the speed and/or power applied to the LPM assemblies. LPM assemblies and their constituent blade foils may be arranged in configurations and locations to enable the placement of other structures and controls to influence in-flows and out-flows of the LPM assemblies and their constituent blade foils and to permit movement of LPM assemblies as a whole, independently from and relative to a fuselage and an LPM assembly on the opposite side of the fuselage.

BRIEF DESCRIPTION OF THE DRAWINGS

FIG. 4 comprises a series of perspective views of individual upper track blade foils with leading edges indicated for clarity and showing control track assembly including wedge slide control blocks as well as connecting rod followers. Also shown are control arms, belt track and blade foil pivot axle, according to one embodiment.

FIG. 5 comprises a series of perspective and cross-section views of individual lower track blade foils connecting rods, control arms, blade foil pivot axles and wedge slide control blocks with the leading edges of the blade foils indicated for clarity, according to one embodiment.

FIG. 20 is a top down view of an LPM assembly showing short span, swept leading edge blade foils in a non-extended span configuration, according to one embodiment.

FIG. 21 is a top down view of an LPM assembly showing extended span ("telescoped" outboard) blade foils configuration, according to one embodiment.

DETAILED DESCRIPTION

The most efficient mechanism for lifting heavy loads, other than lighter-than-air craft such as lifting balloons, and various forms of rigid structure lighter-than-air craft, is to move large volumes of air relatively slowly, as opposed to moving small volumes of air at relatively high speeds. The present embodiments, although relatively compact in size, comprise functional and controllable systems that selectively move large volumes of air at low and/or high speeds. The present embodiments are configured to move large volumes of relatively cool, ambient air or other media at relatively low speeds for relatively efficient, heavy lifting capabilities, as compared to turbofans, turbo props and other vertical lift systems. In fact, the present embodiments offer speed and efficiency performance capabilities currently only associated with high speed fixed wing craft by enabling the operator to cycle between choosing to move large volumes of air in one configuration, then seamlessly transitioning to other configurations to move smaller volumes of air at higher velocities and back again in a continuum of available configurations.

Figure 1:
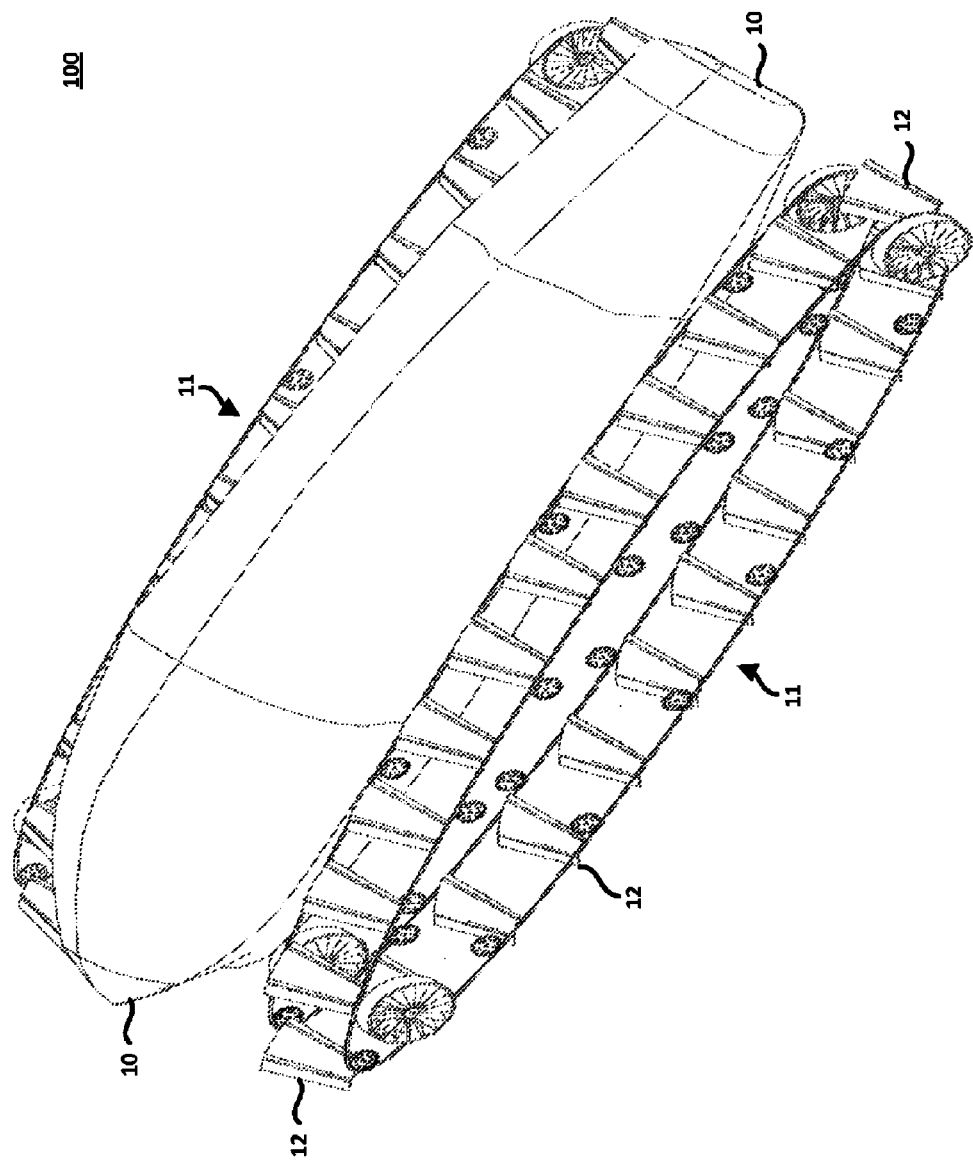
FIG. 1 is an overhead perspective view of a craft comprising a fuselage in the center, flanked on either side with two LPM assemblies, each comprising a plurality of individual blade foils, arranged in longitudinal file about two, bilaterally symmetrical, horizontally laid-out elongated loop paths, according to one embodiment.

Turning now to the figures. FIG. 1 shows a craft 100 comprising a fuselage 10 flanked by lifting, propulsion and maneuvering (LPM) assemblies 11 arranged with one LPM assembly 11 on each side extending for example approximately the length of the fuselage 10, according to one embodiment. Each of these LPM assemblies 11 comprise a plurality of individual, discrete wings, blades or foils (hereafter, collectively, "blade foils") 12, arranged about a (e.g. a generally ovaloid or elliptical shape that may comprise flat segments) elongated loop path 13 to produce the desired forces for lifting, propulsion and maneuvering the craft. The elongated loop path 13, according to one embodiment, may be configured to have a greater dimension along a longitudinal axis of an elongated fuselage than perpendicular thereto. Stated differently, when the craft is flying parallel to level ground, the dimension of the elongated loop path perpendicular to the force of gravity may be greater than the dimension of the elongated loop path that is parallel to the force of gravity. It is to be noted that the fuselage 10 in the figures is a generic fuselage that may be adapted according to the desired functionality and mission to which the craft 100 is destined. As such, the depicted simplified shape and appearance of the fuselage 10 functions merely as a placeholder which, it is to be expected, will vary according to the nature and purpose of the craft 100. According to one embodiment, such a craft may accommodate a human pilot, be controlled autonomously or semi-autonomously by software or be controlled by a remote human pilot. Accordingly, it is to be understood that embodiments cover both piloted and drone aircraft or other media vehicle and/or any combination thereof.

Figure 2:
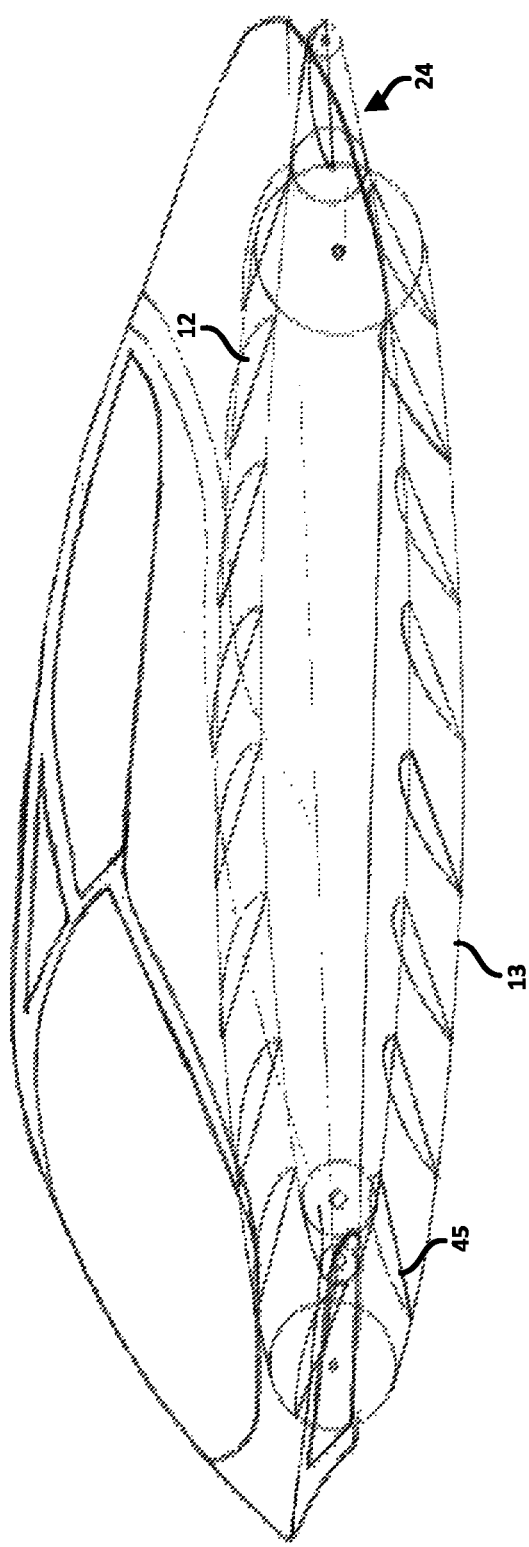
FIG. 2 is a side view of the craft of FIG. 1, showing details of an elongated loop path on the port side of the craft, and further showing multiple blade foils, arranged around a track as well as a control unit, according to one embodiment.

By moving the blade foils 12 from back to front on a first portion (e.g., the top portion) of an elongated loop path 13, as shown in FIG. 2, and following around to a second portion (e.g., the bottom portion) of the elongated loop path 13, then from front to back, pitch angles may be selected at the top of the elongated loop path 13 relative to the bottom of the elongated loop path 13 to thereby achieve lift, forward flight and aft flight at any combination of attitude, altitude and speed, depending on available power. If, for example, the pitch angles of the blade foils 12 on the top of elongated loop path 13 were to be controlled to be shallow, and those along the bottom path of elongated loop path were to be controlled to be steeper (i.e., oriented at a relatively greater pitch angle), or more perpendicular to their direction of travel (front to back), then the craft would move forward assuming the blade foils of the LPM assemblies 11, on each side of the craft, were moving around their respective elongated loop paths 13 at substantially the same speeds with substantially the same pitch and power. Assuming the speeds of revolution along elongated loop paths 13 were sufficient to generate more lift than the weight of the craft 100, and the pitch angles were likewise sufficient to produce that lift, then the craft 100 of FIG. 1 would also rise in altitude. If on the other hand, the LPM assembly 11 on the elongated loop path 13 on the starboard side of the craft 100 were given more power and thus driven at a higher speed of revolution relative to the LPM assembly 11 on the elongated loop path 13 on the port side of the craft 100, or more pitch, or both, then the craft 100 may tend to bank to port and also turn to port (rotate in the vertical plane to port). Advantageously, embodiments exhibit less, if any, adverse yaw as compared with conventional fixed or rotary winged crafts, since increasing power and speed of rotation and/or greater pitch may pull the affected side around, and may also may tend to bank the craft in the same direction, such as may occur in a twin engine fixed wing craft assuming the pilot or flight computer increased thrust in the engine on the same side as the aileron is lowered for a coordinated, banking turn. Embodiments shown in FIG. 1 et seq. may be configured to enable automatic, coordinated, safe turns in either direction at virtually any speed simply by increasing power to the flanking LPM assembly 11 that is opposite to the desired turn and bank. The same applies, according to one embodiment, to differential pitch changes, for one flanking LPM assembly 11 relative to its counterpart LPM assembly 11 on the opposite side of the fuselage.

According to embodiments, structures that favorably affect handling, stability and enable simpler control units construction compared with rotorcraft particularly, are those related to optimal direction of gyroscopic forces as created by movements of LPM assemblies 11 configured according to their placements along fuselage 10. Indeed, by altering the pitch angles of blade foils 12 at various points along the elongated loop paths 13, with or without changing the orientations and/or positions of the LPM assemblies 11 with respect to a fuselage 10, nearly any and all flight attitudes and holding attitudes in hover are, according to one embodiment, attainable. These combinations and differential effects enable for example, nose up, nose down or level attitudes in hover and for trimming purposes in directional flight, which may be used to gain variations in visibility both in flight and in hover and for balancing load positions aboard or in sling loads among functionalities. Assuming that the pitch to the forward half of the bottom pathway blade foils 12 is increased while keeping all other blade foils 12 in their then current pitches and orientations, the craft 100 would be placed in a climbing, nose high attitude. If the pitch angles of the blade foils 12 were increased by a like amount in all aft half of the blade foils 12 on the elongated loop paths 13, then the aft portion of the craft 100 would rise. Imbalanced loads may be addressed in this manner as well. Indeed, according to embodiments, situations in which either the aft or forward sections are more heavily loaded, may be addressed by trimming changes of pitch angles of the blade foils 12 in the affected area.

As alluded to above, the depicted shape of a fuselage 10 in the figures should not be interpreted as conveying any preferred shape thereof. Indeed, the depicted shape of the fuselage 10 is only meant to highlight the potential compactness of the LPM assemblies 11, and is also meant to convey the adaptability to roads and high-speed conventional surface travel, such as on normal roadways, highways and other off-road areas of surface travel, as well as for ease of loading, ingress and egress that a compact structure with such protected LPM assemblies 11 according to embodiments enables. According to embodiments, enhancements to intake mass flow may be achieved, with a combination of fuselage shape and any ducting elements associated with a fuselage, placement of the LPM assemblies 11, and inboard and outboard wing/ducting structures that may be configured to augment funneling and directing of large masses of airflow into the LPM assemblies 11, while also preventing or minimizing unfavorable phenomena common to vertical lift aircraft, such as, for example, vortex regurgitation during certain phases of flight and hover. According to embodiments, wide center of gravity options are enabled advantageously simply as a result of the placement of LPM assemblies including components imparting aerodynamic forces, being located at the periphery of the load space. Likewise in combination with the ability to alter pitch angles to individual, sub-regions or whole LMU blade foils, these lifting units not only have maximum mechanical advantage by virtue of their outer edge placement, they also confer the benefit of producing large lifting forces brought to bear at specific points. Advantageously, according to embodiment, multiple relatively small lifting units (blade foils) are placed all along the load space as bounded by fuselage 10, and their controllability gives an operator or operating system precise options to deal with load asymmetries.

Embodiments enable the fine-grained control of blade foils. For example, segments or groups of blade foils 12 may be controlled independently of other segments or groups of blade foils 12. Moreover, depending upon the control mechanism, individual blade foils 12 may be independently controlled. Described and shown herein are embodiments in which a group of blade foils 12 may be controlled independently of other blade foils 12. Other embodiments shown and described herein enable the control of subgroups or even individual blade foils 12, thereby enabling an unlimited number of control patterns to effectively allow for limitless combinations of lift, propulsion, maneuvering and attitude, each of which may find utility in different situations. For example, controlling each blade foil 12 individually may be carried out such that each blade foil 12 is pivoted to a controlled pitch angle for a desired duration (defined, for example, in terms of a range of positions along elongated loop path 13) or to a controlled pitch angle as the blade foil or blade foils 12 arrive at or near a predetermined position along elongated loop path 13. These control inputs may be transmitted electronically, hydraulically, mechanically or in a variety of combinations for example. Indeed, according to one embodiment, as each blade foil 12 passes a predetermined location along elongated loop path 13, its pitch angle may be controlled to be the same as or different from the preceding blade foil 12. Ultimately, an overall pattern may be configured, precisely tailored and quickly altered under computer control, for example, in response to pilot or programmatic inputs and/or in response to changes in conditions, such that choreographed maneuverings may be achieved by entering a desired maneuver, or response to conditions (both stable and variable) into a computer algorithm and then enabling computer control of the pitch pattern(s) of the blade foils 12, elongated loop path 13 speeds (including starboard elongated loop path(s) 13 relative to port side elongated loop path(s) 13) and engine power (in one embodiment, the engine power applied to each LPM assembly 11 may be independently controlled and coordinated) to produce a desired flight effect or flight path profile. One embodiment comprises more than one LPM assembly 11 per side of craft, and such LPM assemblies 11 may be disposed adjacent to one another horizontally, may be located in tandem, fore and aft (leading/trailing one another) stacked vertically, or nested within each other, for example. As shown in FIG. 1, the blade foils 12 may be disposed, according to one embodiment, in close proximity to fuselage 10. This close proximity enables further functionality and advantages, as detailed herein below.

Advantageously, the forces acting upon each blade foil 12 are smaller than the forces that would otherwise act on comparatively larger surface areas of conventional rotary of fixed wings. Each blade foil 12, therefore, carries only a small portion of the total load, and flights may be continued despite damage to or even loss of one or more blade foils 12. Additionally, the close proximity of the aerodynamic surfaces of the blade foils 12 and their components to the fuselage 10 advantageously minimizes their vulnerability, as compared to the aerodynamic surfaces of conventional fixed or rotary wings. This close proximity and any protective structures added beneficially as a result of the close proximity of an entire LPM assembly 11, in turn, acts to protect occupants of the craft, as well as to protect surrounding structures from damage as a result of contact with the fast moving blade foils. Maneuvering in constrained areas is also greatly improved, as compared to conventional fixed or rotary wing aircraft. Other advantages of the present embodiments include ease of de-icing, enhanced protection against bird strikes and other hazards, and the ability to use less exotic materials for construction of aerodynamic surfaces, given the vastly decreased lever arm/moments that bear on these surfaces and structures. Advantageously the close proximity of the blade foils 12 to the fuselage 10 affords opportunities to incorporate other components having fixed and/or movable surfaces such as fences, ducts, vanes, slots, slats, skirts, jets of bleed air and other aerodynamic entities into the craft, according to embodiments. These components may be attached to the fuselage or other nearby structures, and/or coupled to the blade foils 12 themselves.

According to further embodiments, the blade foils 12 may be configured to follow elongated loop path 13 such that their respective leading edges remain the same and, in the case of counter clockwise progression around a port side elongated loop path 13, these leading edges may be facing forward along the top portion of the path of elongated loop path 13 whereas along the bottom portion they may be pointing aft. It may be more favorable aerodynamically, particularly in forward and aft flight however, to keep the attitude of blade foils aligned with the horizontal direction of flight, and for this reason, embodiments that account for the majority of the illustrations and descriptions are configurations that change the leading edges of each blade foil 12 as each progresses along elongated loop path 13 and particularly, at the ends of the elongated loop paths where blade foils 12 are controlled in such a way that they remain aligned with relative flows. Having the leading edge of the blade foils 12 alternate as they progress along the top path relative to the bottom path of elongated loop path 13 enables each blade foil to maintain its upper surface facing upwards and its lower surface facing downwards throughout the entire revolution thereof around elongated loop path 13. As a result, each phase of the cycle of the blade foils 12 around elongated loop path 13 may then, as well as the blade foil shapes and chords themselves, according to one embodiment, be optimized for its or their particular function. The structures and methods that enable alternating leading edges of blade foils 12, while simultaneously maintaining upper surfaces thereof on top, and lower surfaces thereof on the bottom throughout a cycle are detailed hereunder. According to one embodiment, for forward travel, the edges of blade foils 12 may be optimized for high speed forward flights to account for the much higher air speeds and shallower pitch angles on the top of the elongated loop path 13 relative to the bottom half of the elongated loop path 133, according to one embodiment. Embodiments are configured to enable incorporation and/or optimization of sweep angles, edge slots, edge slats and including such features as blade foil 12 tip effects including wing tip fences, shapes, vortex generators and winglets among others. Another functionality of embodiments is the capability to increase top speeds. Indeed, configuring the leading edges of the blade foils 12 to be swept and/or extremely thin on the forward moving pathway (e.g., top portion) of elongated loop paths 13, may enable even supersonic flight, due to the streamlining of the blade foils 12 and the elimination of retreating blade stall, among other limitations. The structure of the blade foils 12 and the elongated loop paths 13 also enables the elimination of other undesirable phenomena, including blowback, dissymmetry of lift and other instabilities.

It should also be noted, referring to FIG. 1, that control assemblies may be located outboard of LPM assemblies 11 as shown or may advantageously be located between LPM assemblies 11 and fuselage 10, may be an integral part of fuselage 10 or may be disposed within fuselage 10, according to embodiments. According to embodiments, other aerodynamic structures to augment flow and/or lift effects among others may be added as desired given the configuration of the craft and the ability to alter whole LPM assemblies 11 with respect to the rest of the structure(s). Such structures may participate in configuration changes in addition to aerodynamic functionalities. Likewise, rotating components, now exposed to high relative airstreams, may be utilized for propulsion, lift and maneuvering including pitch control.

FIG. 2 shows the functionality of shifting leading edges of blade foils 12 along the upper portion of elongated loop path 13 paths and the lower portion of elongated loop path 13. The leading edges of the blade foils 12 traveling along the upper portion of the elongated loop path 13 in a forward direction along the direction of forward flight may be shaped or streamlined for high relative flows (such as, for example, a truncated delta wing pattern) and when these blade foils 12 reach the forward apex of elongated loop path 13, transitioning to the lower portion of an elongated loop path 13, the now leading edges, which were trailing when traveling along the upper portion of elongated loop path 13, may now assume a more traditional thick cord, high lift and more propulsive (e.g., higher drag) configuration. According to one embodiment, when blade foils 12 reach the farthest aft location along elongated loop path 13, they may, depending on their shape and chord, once again revert to a more laminar flow shape, either simply as a result of their direction of travel relative to the direction of overall craft travel given the fact that leading and trailing edges of the blade foils 12 trade places, and/or as a result of more complex mechanisms utilized to create additional changes based on angle of attack or coefficient of lift. Moreover, any other changes that contribute to either highly streamlined configurations in the upper portion of elongated loop path 13 or high lift, high propulsion configuration in the lower portion of elongated loop path 13 over aerodynamic surfaces in one region or another or both, with reference to elongated loop paths 13 to augment lift, drag (propulsion) or other effects such as diffusion of noise, heat or other byproducts of power generation and flight, are within the scope of the embodiments shown, described and claimed herein.

Figure 3:
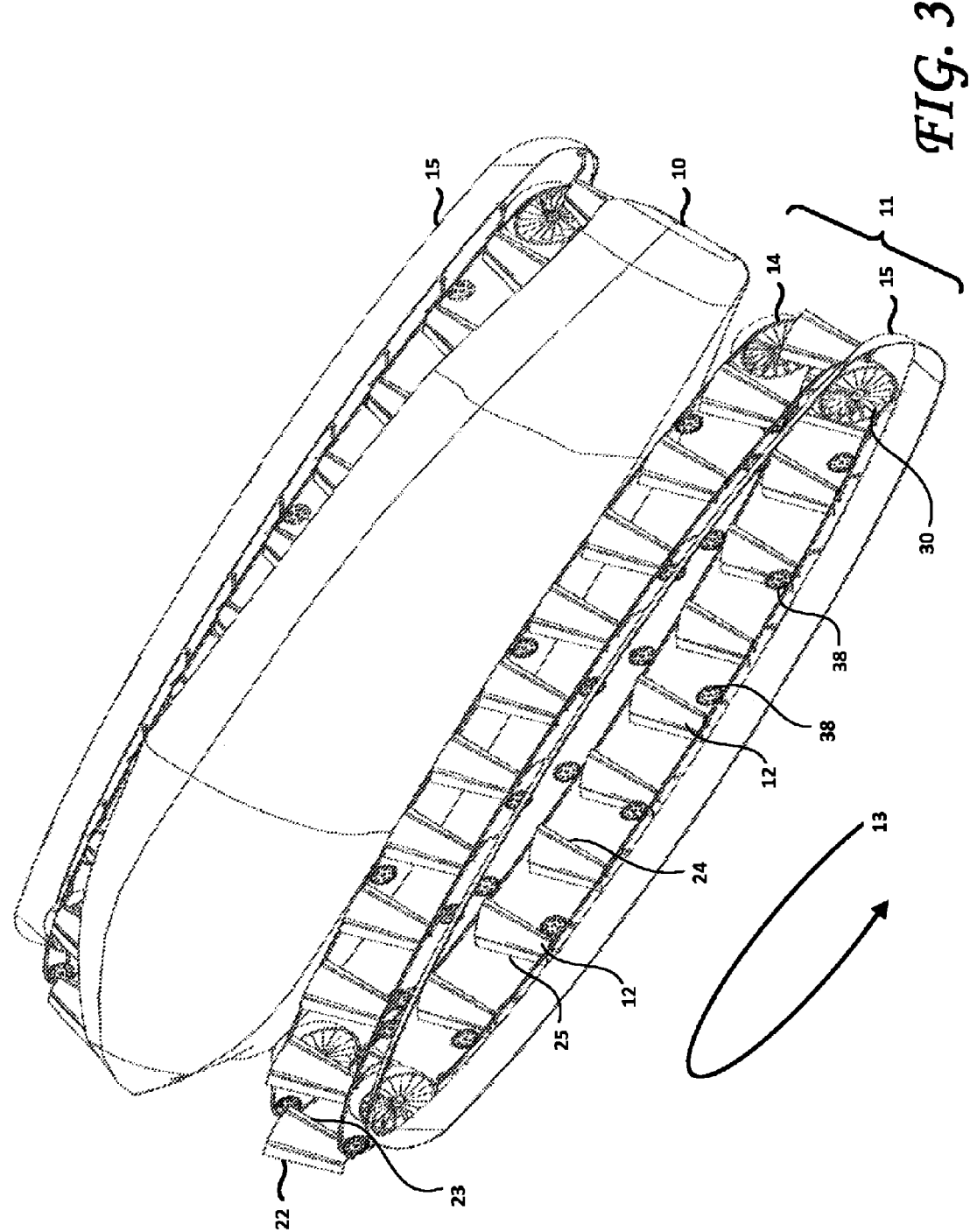
FIG. 3 is a perspective view of a craft of FIG. 1, showing upper leading edge slats, upper trailing edge flaps, lower blade foil leading edge slats, lower trailing edge flaps, along with an elongated cone-shaped control track and driving track, according to one embodiment.

FIG. 3 shows control units 15, which may comprise elongated cone-shaped tracks whose curvature is followed by a plurality of control arms 20, each of which is coupled to a respective one of the plurality of pivoting blade foils 12. In this manner, relative angles and distances between the control unit 15 and the pivot points about which each blade foil 12 pivots (best shown at reference 21 in FIG. 37), and the manner in which the blade foils are constrained by driving tracks 14, may dictate individual pitch angles (and/or chord length) of each of the blade foils 12 as they progress around elongated loop path 13 according to embodiments. Other control configurations that achieve the same or similar comprehensive control of individual blade foils 12 around an elongated loop path may be envisioned, all of which are considered to be within the scope of embodiments herein. As shown in FIG. 3, the leading edges 22 of the blade foils 12, which may comprise flaps or other lift enhancing components, may become the trailing edges of the blade foils 12, as the blade foils 12 transition from the upper portion of elongated loop path 13 to the lower portion thereof. Similarly, the trailing edges of the blade foils 12 on the upper portion of the elongated loop path 13 may become the leading edges of the blade foils 12 traveling on the lower portion of the elongated loop path 13 blade foil. Advantageously, blade foil edges, sweep angles and chord shapes and lengths may be optimized for their respective roles as the blade foils 12 travel along the upper portion of elongated loop path 13 and as the blade foils travel along the lower portion of the elongated loop path 13. That is, the blade foil characteristics may be dynamically and differentially adjusted for blade foils 12 travelling along the upper portion of the elongated loop path 13 and for blade foils 12 travelling along the lower portion of the elongated loop path 13, such as during forward flight, (usually the direction of desirably higher speeds), hovering, attitude, climbing and cruising portions of common flight plans. Moving the control units 15 in an inboard direction would, according to embodiments, move all blade foil angles along both upper and lower portions of elongated loop paths 13 to lower pitch configuration. In contrast, moving control units 15 in an outboard direction would, according to one embodiment, move all blade foil angles along both upper and lower portions of elongated loop path 13 to higher pitch configurations. Moving control units 15 upward relative to blade foil pivot points as located by attachments to driving tracks 14 would, according to one embodiment, decrease the pitch angles of the blade foils 12 along the top portions of elongated loop paths 13 while increasing pitch angles of blade foils 12 along the bottom portions of elongated loop paths 13, thereby causing the craft to move forwards. Moving control units 15 downward, according to one embodiment, may cause the opposite effect; namely to increase the pitch angles of the blade foils 12 along the top portions of elongated loop paths 13 while decreasing the pitch angles of blade foils 12 along the bottom portions of elongated loop paths 13 causing the craft to retreat. According to one embodiment, all attitudes, directional changes and altitude changes including speeds and rates may be made available by differentially controlling the LPM assemblies 11.

FIG. 4 shows another embodiment of a control unit. In this case, the control unit 15 may comprise a moving track control unit 15 with angled control elements 17, which may be configured to raise and lower control arm connecting followers 18 and control arms 20, which correspondingly raise and lower the pitch angles of blade foils 12. The alternative embodiments shown here include that the functionality and interdependency of individual blade foils including their control arms relative to control units 15 is ensured and demonstrated. Additionally, in this embodiment, high speed bearing components are not required for the control arm followers 18 and these components, according to one embodiment, may advantageously be constructed of low weight, low heat tolerance materials. It should also be noted that the attachment point of the through-blade foil elements 19 may be located at any point along the chord of the blade foil, according to embodiments.

FIG. 5 shows blade foils 12 positioned along the lower portion of elongated loop paths 13, and demonstrates that movement of control units 15 away from driving tracks 14 results in increasing the pitch angles of the blade foils 12 and moving control units 15 towards driving tracks 14 results in decreasing the pitch angles of the blade foils 12 along the lower portion of elongated loop path 13, resulting in the same pitch change directions as are effected by those same relative movements, control unit 15 to drive track 14, for the blade foils 12 along the upper portion of the elongated loop path 13, thereby resulting in a "collective" same-direction pitch change in the blade foils 12 traveling along both upper and lower portions of elongated loop path 13. It should also be noted that such pitch change mechanisms may easily be envisioned to change individual or a limited series of blade foil pitch angles at any point along the elongated loop path 13, according to embodiments herein.

Figure 6:
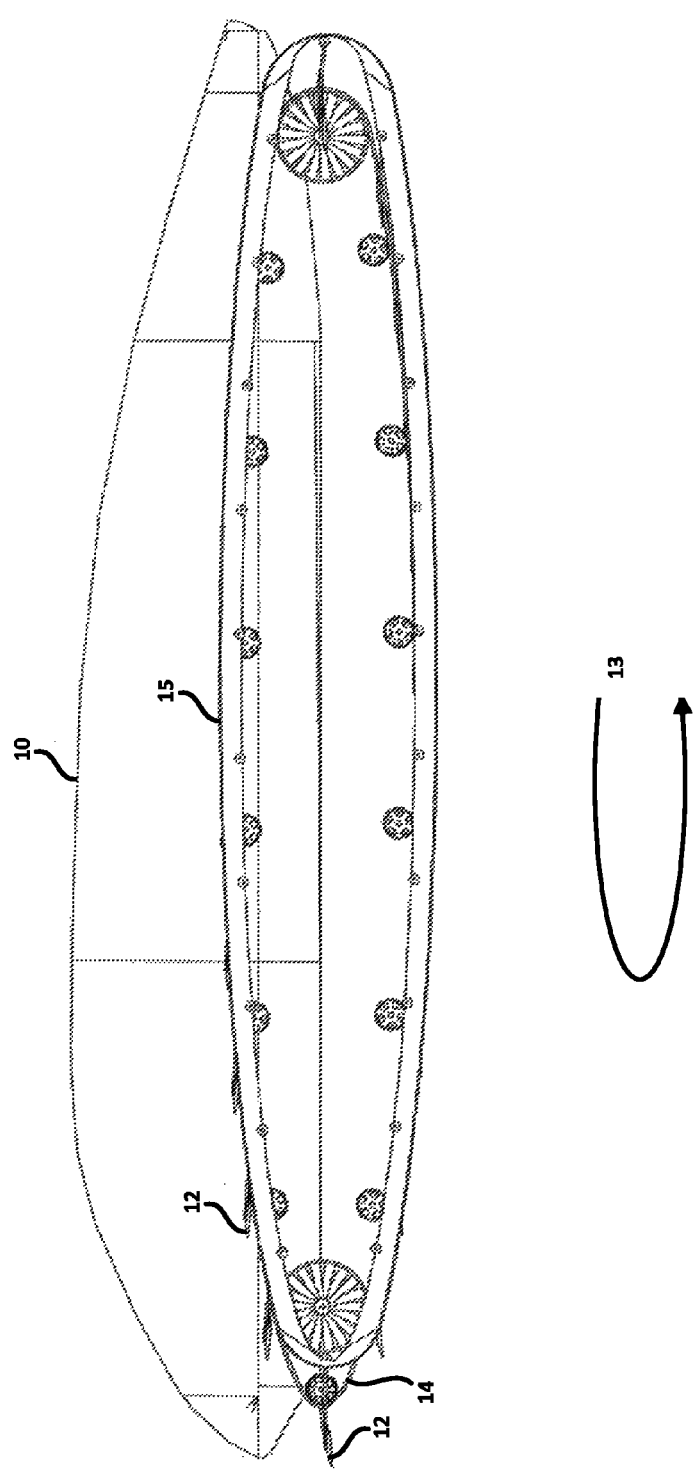
FIG. 6 is a port side view of the craft of FIG. 1 showing an elongated cone-shaped control track in low pitch position, closer lateral to a fuselage, as well as blade foils and driving track, according to one embodiment.
Figure 7:
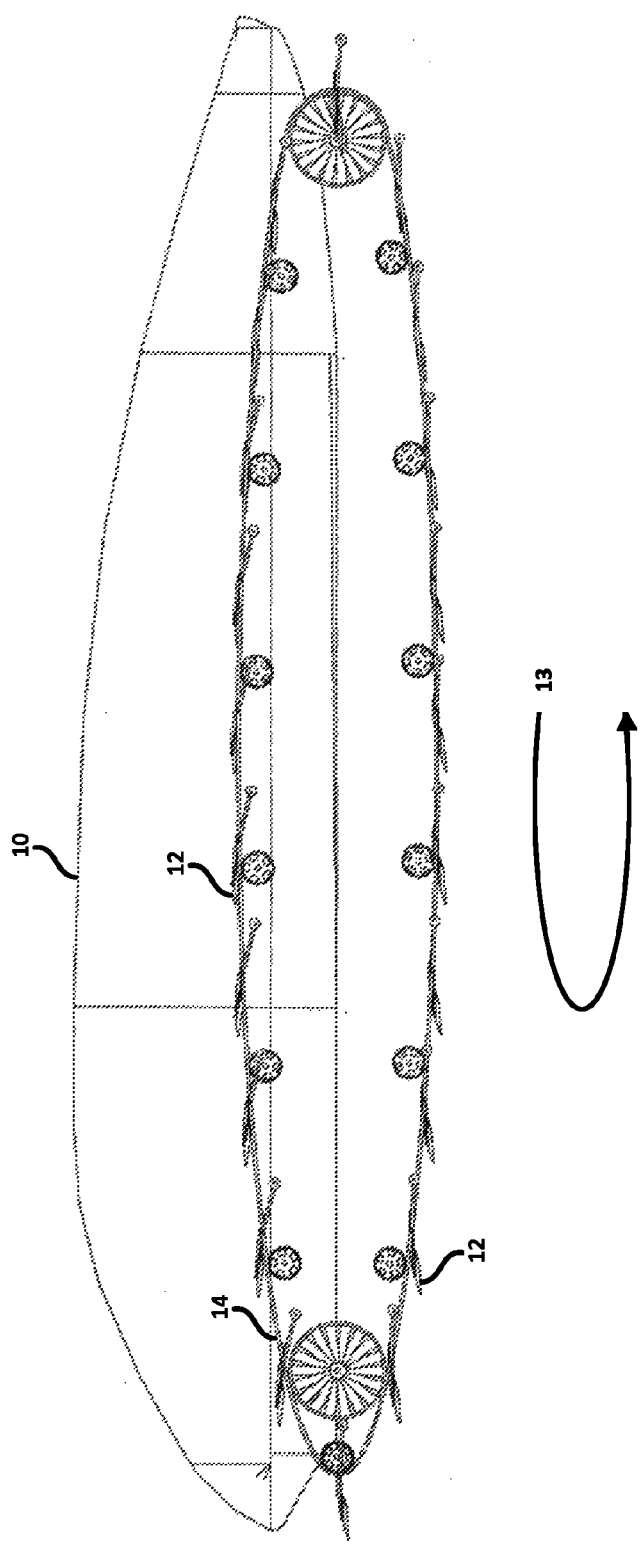
FIG. 7 is a side view of the craft of FIG. 1 with the elongated cone-shaped control track removed for clarity, showing blade foils in angles resulting from low pitch position of control loop unit as shown in FIG. 6, according to one embodiment.
Figure 8:
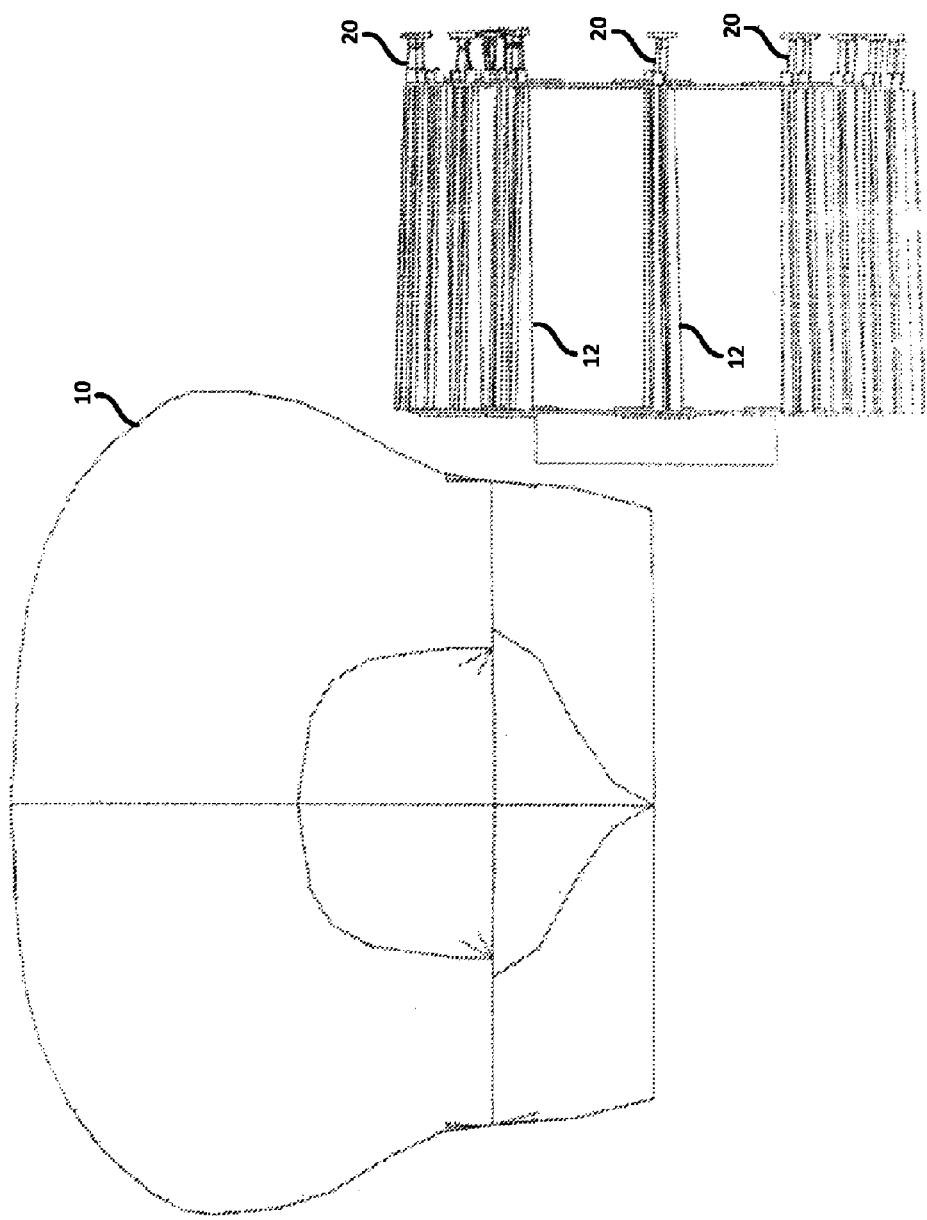
FIG. 8 is a head-on view of the craft of FIG. 1, showing blade foils in cross-section and control arms in angles resulting from low pitch position of control loop (not shown here for clarity) as shown in FIG. 6, as well as the fuselage, according to one embodiment.

FIGS. 6, 7 and 8 are various views of the effects of moving control unit 15 inwards (towards) relative to drive tracks 14, which are the components that constrain the position of the blade foils and thus determine the pitch or angle of attack in space around elongated loop paths 13. Indeed, the pitch angles and other changes relative to blade foils may be controlled, according to one embodiment, by changing the relative positions of control units 15 and drive tracks 14. FIG. 6 is a side view showing a control unit 15. In FIG. 7, control unit 15 is removed to clearly show changes in the pitch of the blade foils 12 as the blade foils 12 travel around elongated loop path 13. In FIG. 7, the pitch angles of the blade foils 12 are relatively "neutral" and approximately of equal value in both the blade foils 12 traveling along the upper portion of elongated loop path 13 and for blade foils 12 traveling along lower portion of the elongated loop path 13. Such a configuration may be suited, according to one embodiment, to a hover configuration or at least a configuration in which the horizontal motion of the craft is stable, and in which vertical positioning or change in altitude may be determined by the power delivered to the LPM assembly(ies) 11 on the port and starboard sides, as well as loads and load distributions. Likewise, FIG. 8 is a front view of a craft according to one embodiment that shows only a portside LPM assembly 11, with its control unit 15 removed for clarity. In this view, control arms 20 are shown in relatively neutral or at rest positions, similar to the pitch angles they dictate for blade foils 12, according to embodiments. In this position, the control arms are simply following their path around the outside, expanded section of control unit 15, which is as a result of control unit 15 being moved in, towards fuselage 10.

Figure 9:
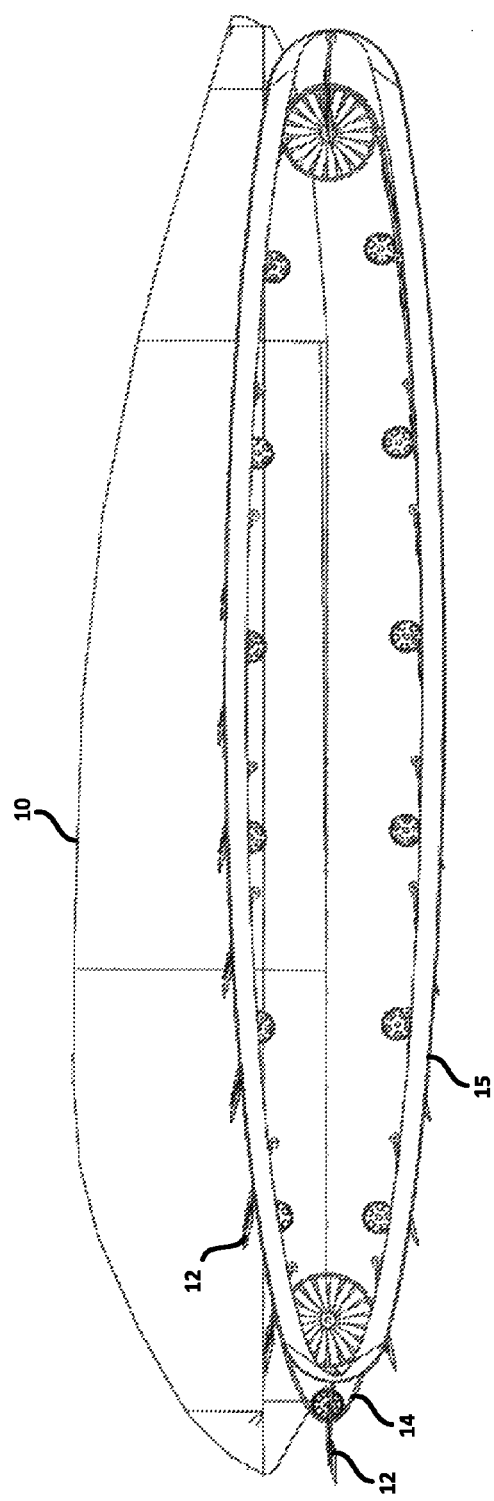
FIG. 9 is a side view of the craft of FIG. 1, showing an elongated cone-shaped control track in a high pitch position, laterally farther from a fuselage, as well as blade foils and driving track, according to one embodiment.
Figure 10:
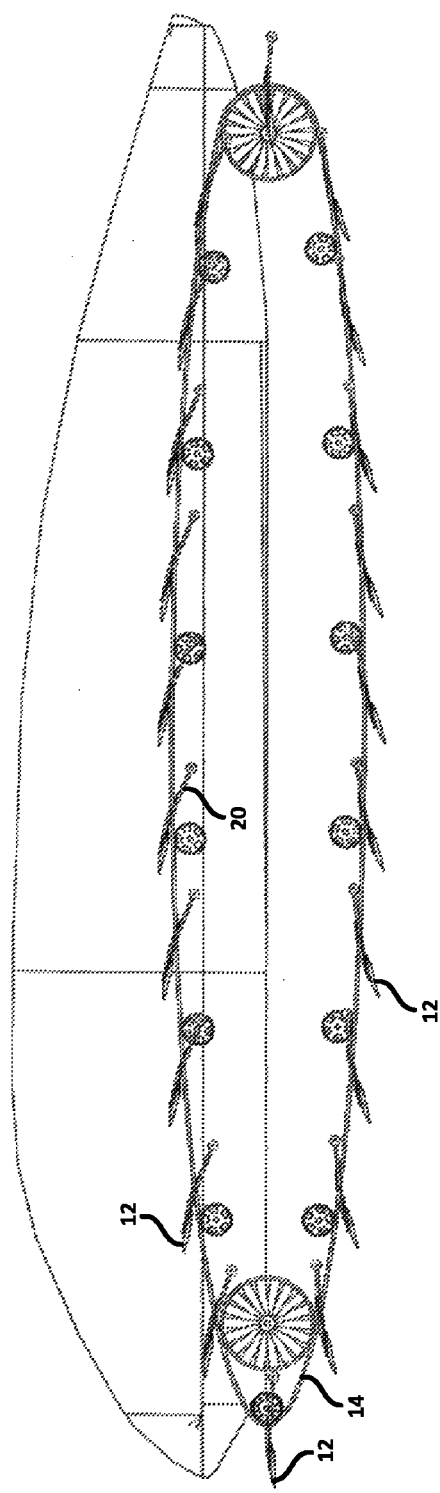
FIG. 10 is a side view of the craft of FIG. 1, with the elongated cone-shaped control track removed for clarity, showing blade foils in angles resulting from high pitch position of control loop unit as shown in FIG. 9, according to one embodiment.
Figure 11:
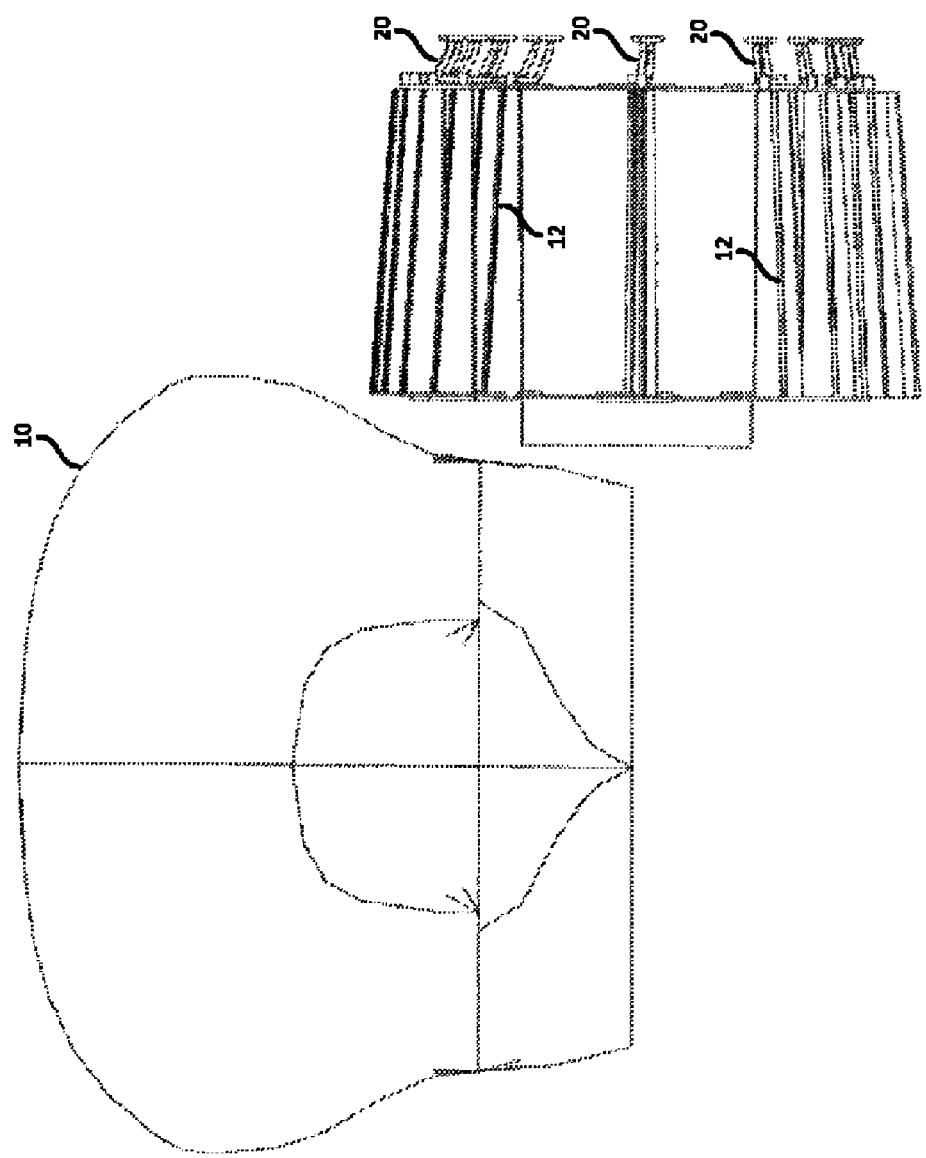
FIG. 11 is a head-on view of the craft of FIG. 1, showing blade foils in cross-section and control arms in angles resulting from high pitch position of control loop (not shown here for clarity) as shown in FIG. 9, as well as fuselage according to one embodiment.

FIGS. 9, 10 and 11 are similar views to those shown in FIGS. 6, 7 and 8, and show the effects of moving control unit 15 farther away from blade foils 12 locating attachments on drive units 14, and thus, in this embodiment, farther away from fuselage 10. Indeed, moving control unit 15 farther away from blade foils 12 locating attachments on drive units 14 collectively increases the pitch angles of control arms 20 and their attached blade foils 12. This effect may be envisioned by comparing the positions of the control arms 20 of FIG. 11 to FIG. 8. In FIG. 11, the control arms are effectively all squeezed together towards the middle as a result of the constraint of the control unit "cone" being moved away from the fuselage 10, resulting in increased pitch of all blade foils along the elongated loop path 13. It should also be noted that, according to embodiments, control units 15 of the individual LPM assemblies 11 may also be moved inwards and/or outwards as well as up or down in equal or differential distances at their forward ends and aft ends. Alternatively, the control units 15 may be moved only at the forward or aft ends including any combination of relative movements thereof, which then causes a selected, controlled increase or decrease in control arm-induced blade foil pitch in selected portions of the elongated loop path 13. For example, a control unit 15 may be moved away from drive track blade foil locating attachments at the forward end of one LPM assembly 11 while moving the aft end towards blade foil 12 attachments, thus creating differential "collective" control of blade foils, forward relative to aft. In this instance, such differential collective control of the blade foils increases pitch in forwardly located blade foils 12 along both the upper and lower forward portions of elongated loop path 13, while simultaneously decreasing the pitch angles thereof aft along both upper and lower portions of aft elongated loop path 13, resulting in a raising of the nose of the craft, according to embodiments. In other words, according to embodiments, moving control units 15 towards blade foils' constraining components on drive track 14 decreases pitch. Conversely, moving control units 15 away from blade foils' constraining components on drive track 14 increases the pitch angles of the blade foils "collectively" along both upper and lower portions of elongated loop path 13.

Figure 12:
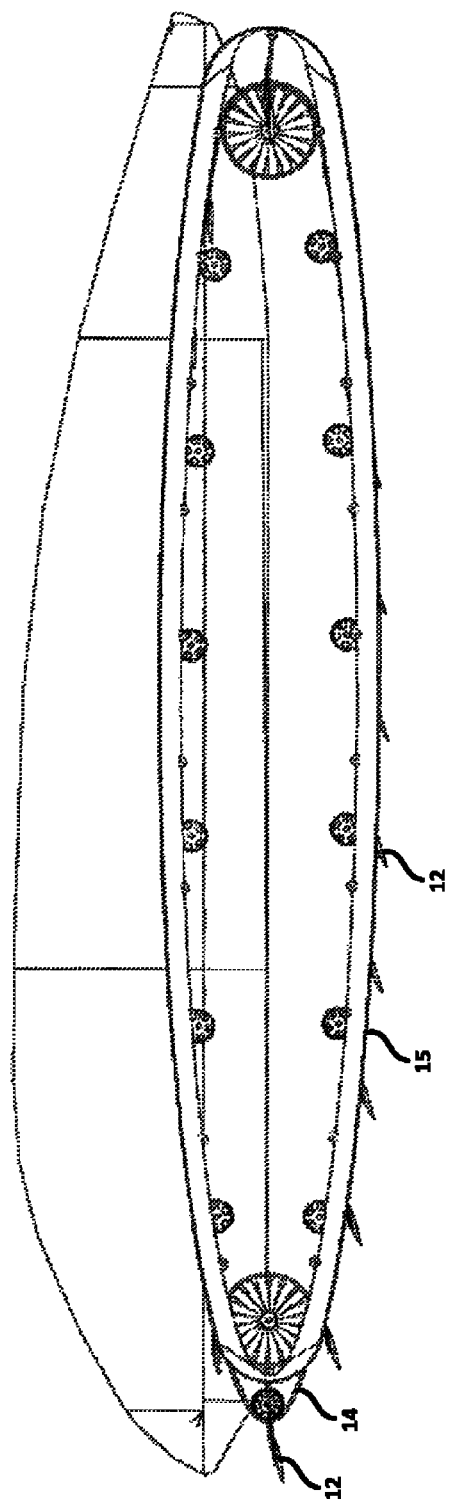
FIG. 12 is a side view of the craft of FIG. 1, showing the elongated cone-shaped control track in a raised position relative to driving track, resulting in higher pitch angles of blade foils along the lower track portion of an LPM assembly, and flatter (lower) pitch angles of those blade foils along the upper track portion of the LPM assembly, according to one embodiment.
Figure 13:
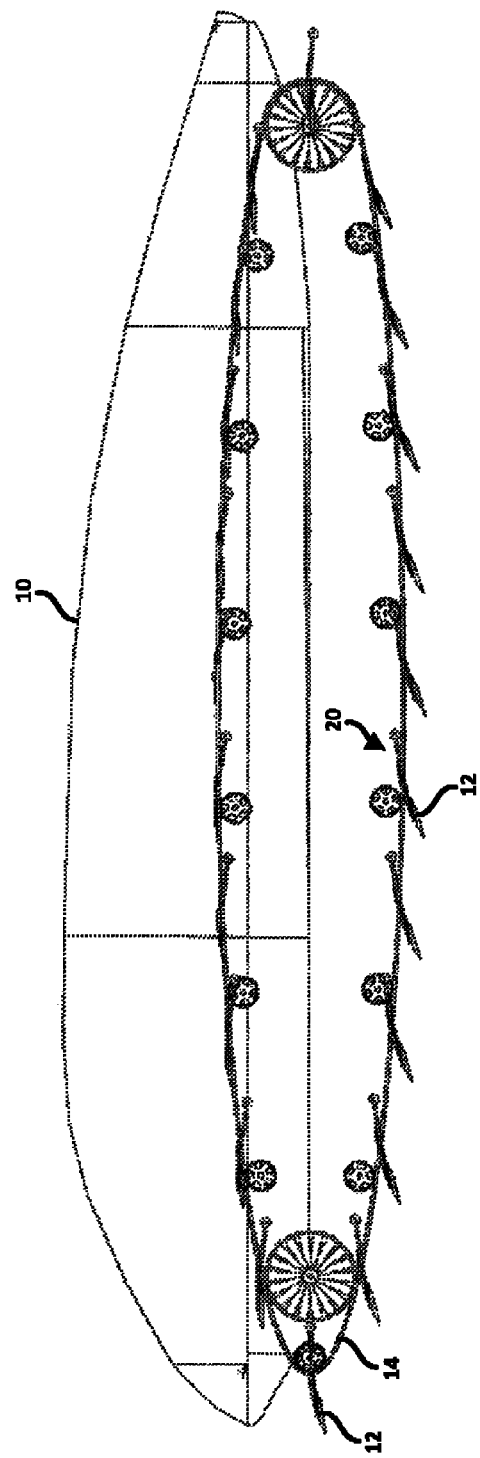
FIG. 13 is a side view of the craft of FIG. 1 with the elongated cone-shaped control track removed for clarity, showing blade foils in differential pitch angles for an upper blade foil group relative to a lower blade foil group, resulting from a raised position of the elongated cone-shaped control track as shown in FIG. 12 according to one embodiment.
Figure 14:
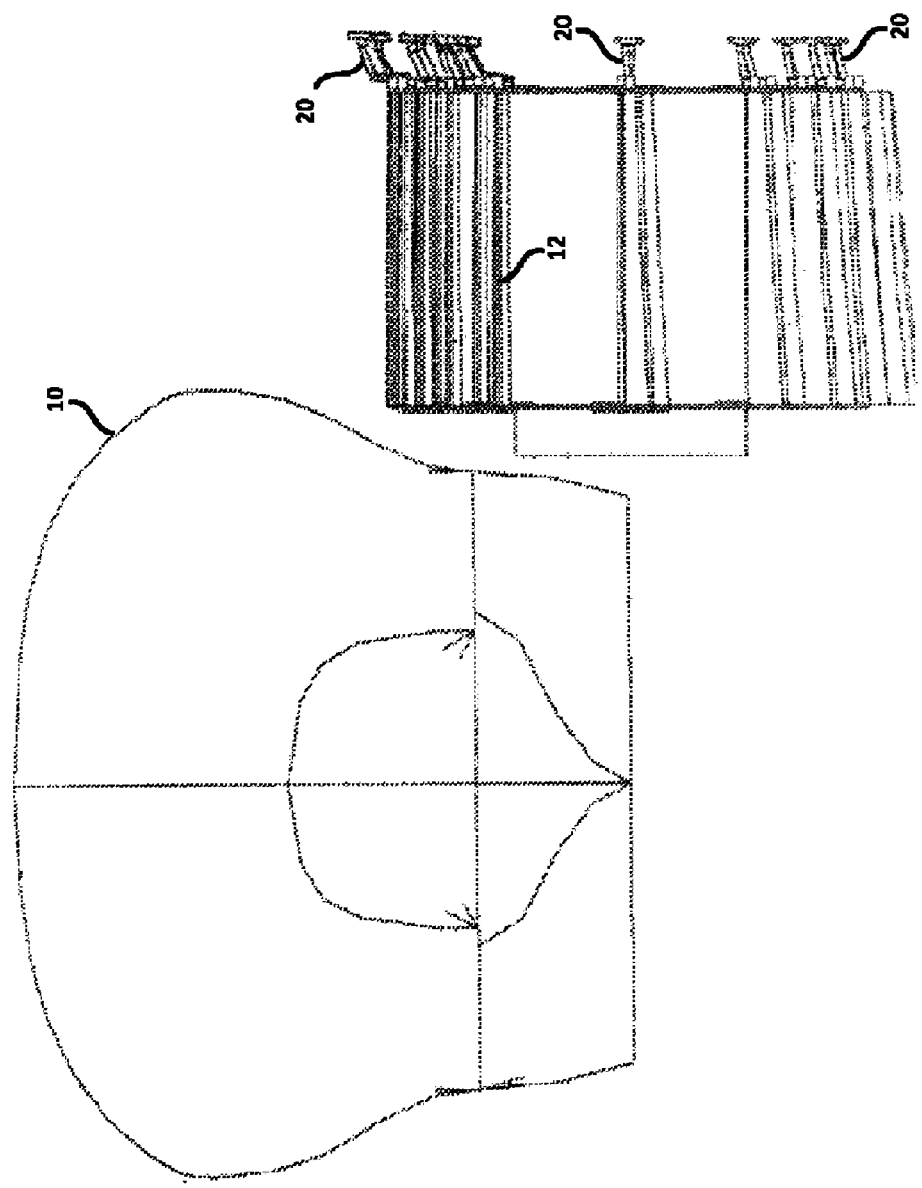
FIG. 14 is a head-on view of the craft of FIG. 1 showing blade foils in cross-section and elevated angles of control arms resulting from high position of the elongated cone-shaped control track (not shown here for clarity) relative to driving track as shown in FIG. 12, as well as fuselage according to one embodiment.

According to embodiments, the control units 15 may be moved towards or away from the fuselage 10. Also according to embodiments, the control units 15 may be moved up or down relative to the fuselage 10. Combined movements toward, away, up or down may be carried out, according to embodiments. Indeed, any of these movements may be carried out independently of one another relative to the forward or aft end of each LPM assembly 11. FIGS. 12, 13 and 14 are similar views showing the effects of raising the position of control units 15 relative to attachment/pivot points for blade foils 12, which causes the pitch angles of the blade foils 12 to increase along the lower portion of elongated loop path 13, with a corresponding decrease in or neutral positioning of pitch angles of the blade foils 12 along the upper portion of elongated loop path 13. Such a configuration would, according to one embodiment, cause the craft to move forward. Alternatively, making these changes to control unit 15 positioning on only a port side LPM assembly would cause a craft according to embodiments to rotate to starboard (and may also automatically bank to starboard as well depending on power input to port LPM assembly relative to starboard LPM assembly) in the horizontal plane. FIG. 14 illustrates this by showing the control arms 20 along the upper track and lower track being raised, resulting in flatter pitch of the blade foils 12 along the upper portion of elongated loop path 13 and increased blade foil pitch along the lower portion of elongated loop path 13, resulting in forward and/or climbing flight.

Figure 15:
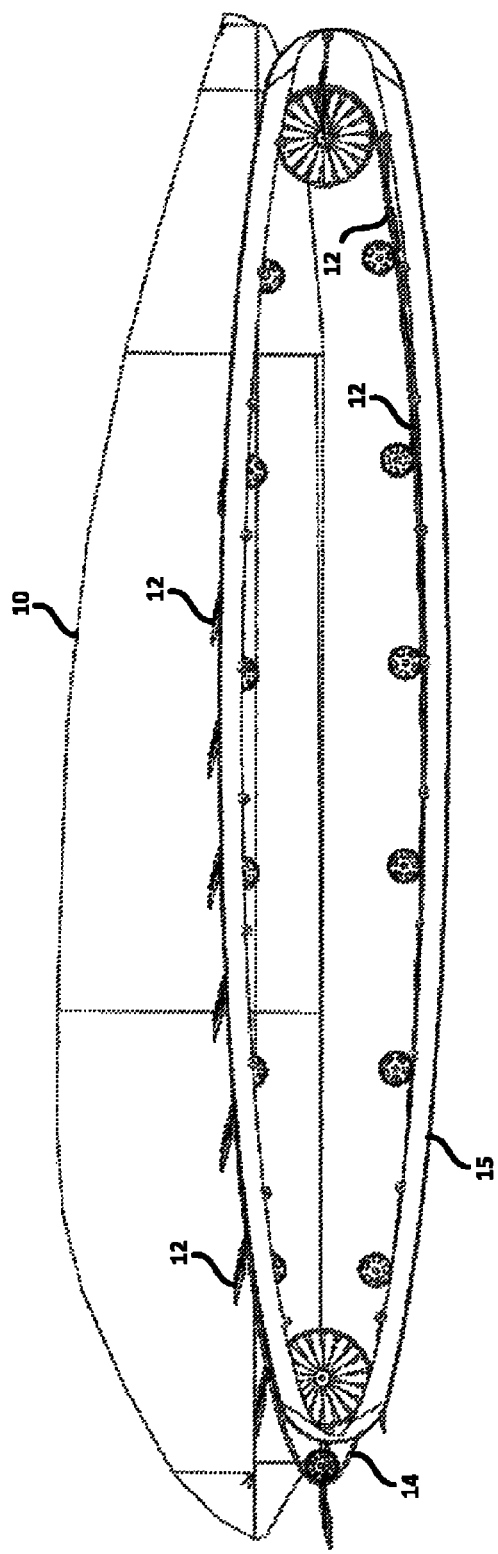
FIG. 15 is a side view of the craft of FIG. 1 showing the elongated cone-shaped control track in a lowered position relative to driving track resulting in lower pitch angles of blade foils along the lower track portion of LPM assembly, and higher pitch angles of those blade foils along the upper track portion of the LPM assembly, according to one embodiment.
Figure 16:
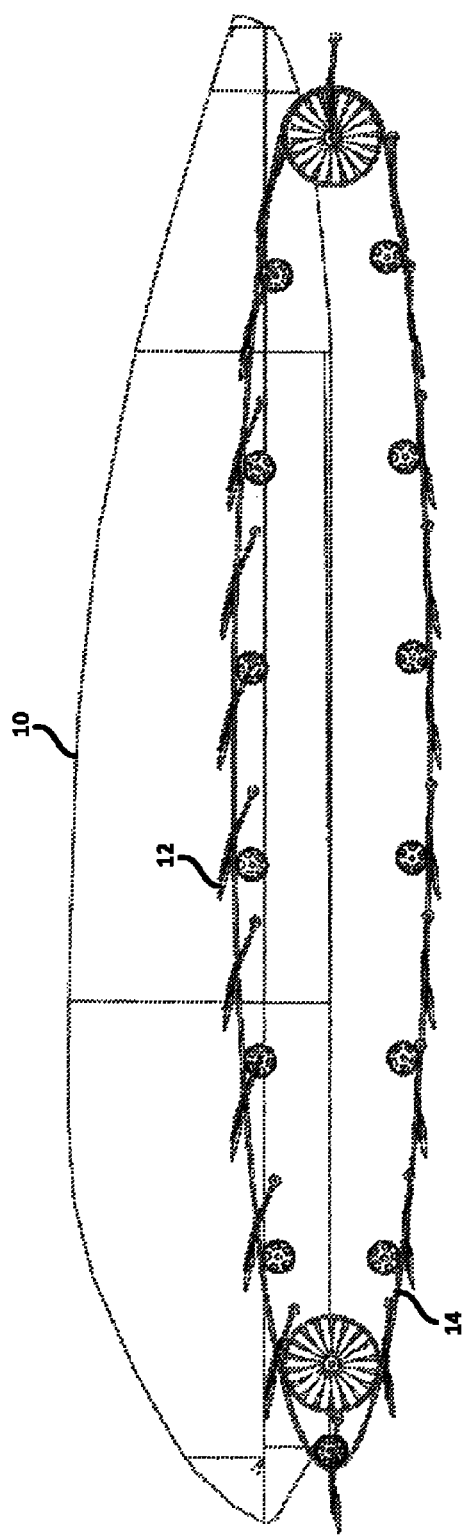
FIG. 16 is a side view of the craft of FIG. 1 with the elongated cone-shaped control track removed for clarity, showing blade foils in differential pitch angles for an upper blade foil group relative to a lower blade foil group, resulting from lowered position of the elongated cone-shaped control track as shown in FIG. 15, according to one embodiment.
Figure 17:
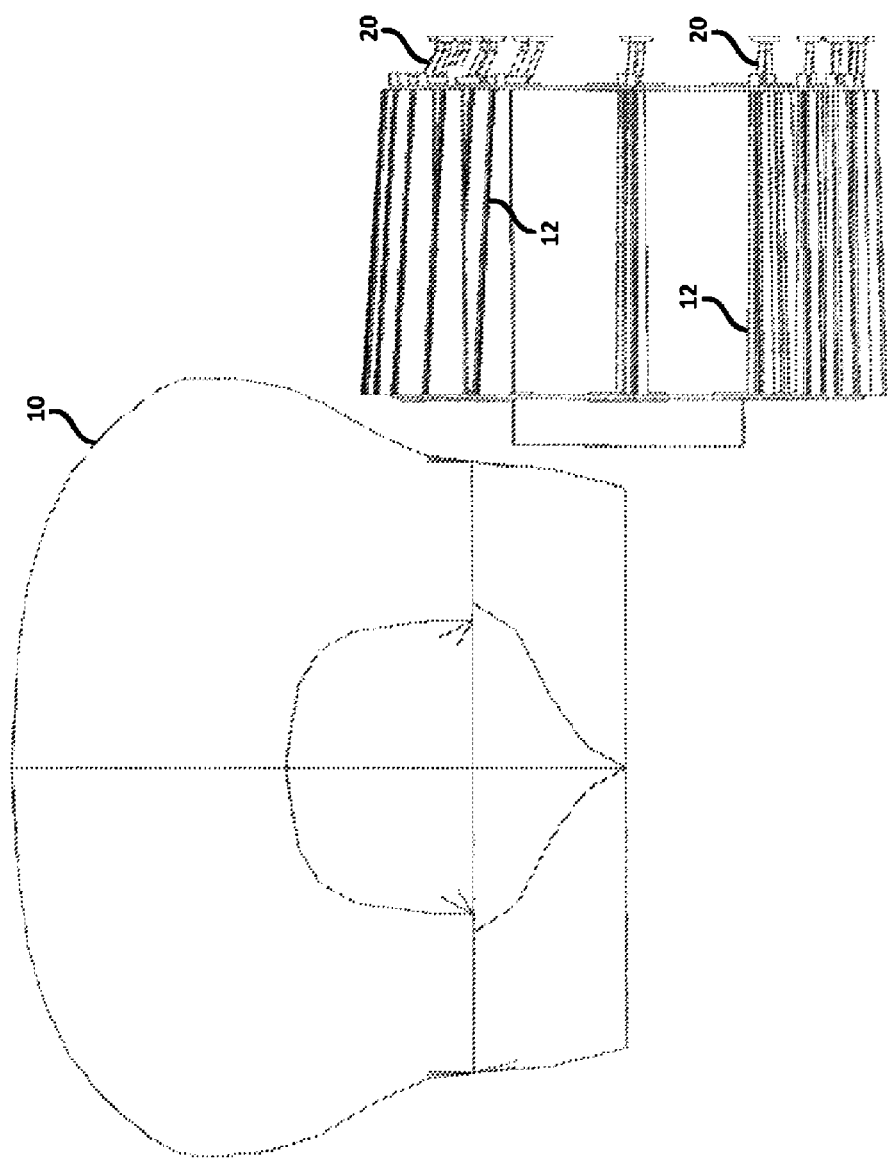
FIG. 17 is a head-on view of the craft of FIG. 1 showing blade foils in cross-section and elevated angles of control arms resulting from low position of the elongated cone-shaped control track (not shown here for clarity) relative to driving track as shown in FIG. 15, as well as fuselage, according to one embodiment.

FIGS. 15, 16 and 17 show the effects of lowering control units 15 as a whole, causing the pitch angles of the blade foils 12 to increase along the top portion of elongated loop paths 13 and to simultaneously decrease the pitch angles of the blade foils along the lower portions of elongated loop paths 13. The effect of such a configuration would be to cause a craft according to embodiments to retreat backwards and, assuming adequate power input, climb in reverse direction relative to the forward orientation of the craft. Alternatively, if these control inputs are applied only to port side LPM assembly (ies) 11, a craft according to embodiments would tend to rotate (port side retreats) and also bank to port. Thus, comparing inputs shown in FIGS. 12, 13 and 14 with those shown in FIGS. 15, 16 and 17, it may be recognized that turning (and banking if desired) a craft to port according to embodiments may be carried out in several ways, including backing the port side up or, alternatively as desired, advancing the starboard side. According to embodiments, both of these may be carried out while differentially elevating or lowering the height of port side relative to starboard side with simple inputs and control mechanisms. Again, it should be noted that individual control units 15 may be moved up, down, in, or out at their forward or aft loci, resulting in a continuum of control options affecting individual blade foils at any point on the elongated loop path(s) 13.

Figure 18:
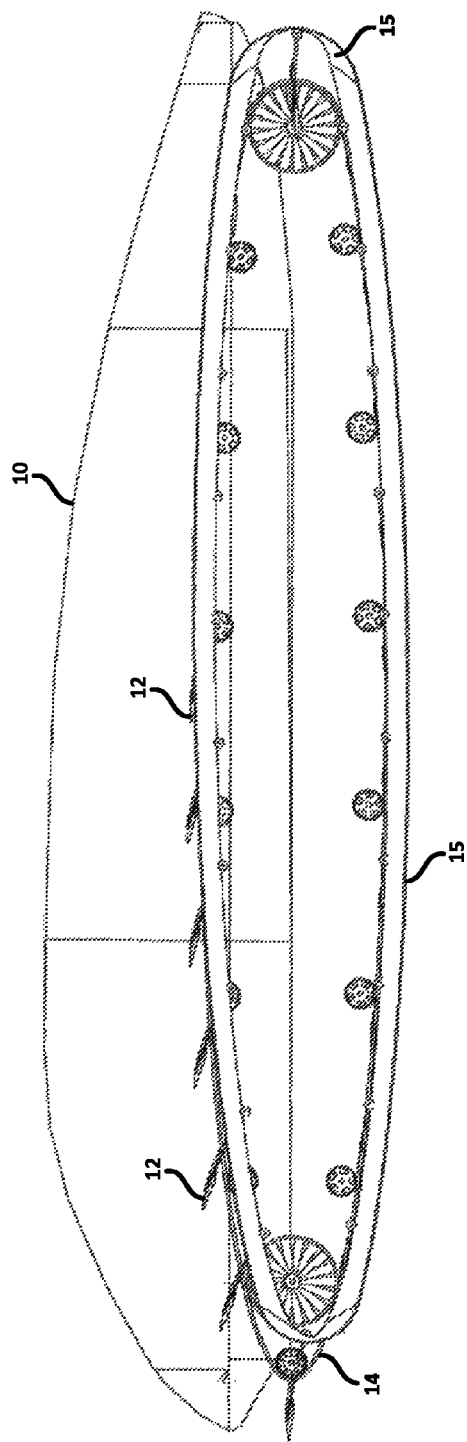
FIG. 18 is a side view of the craft of FIG. 1 showing the elongated cone-shaped control track in an angled position longitudinally relative to driving track such that the elongated cone-shaped control track is shown lowered towards the front of the craft of FIG. 1, and in a neutral position vertically, aft resulting in higher pitch angles of blade foils along the forward upper track portion of the LPM assembly, and neutral pitch angles of those blade foils along the rest of the track portions of the LPM assembly, according to one embodiment.
Figure 19:
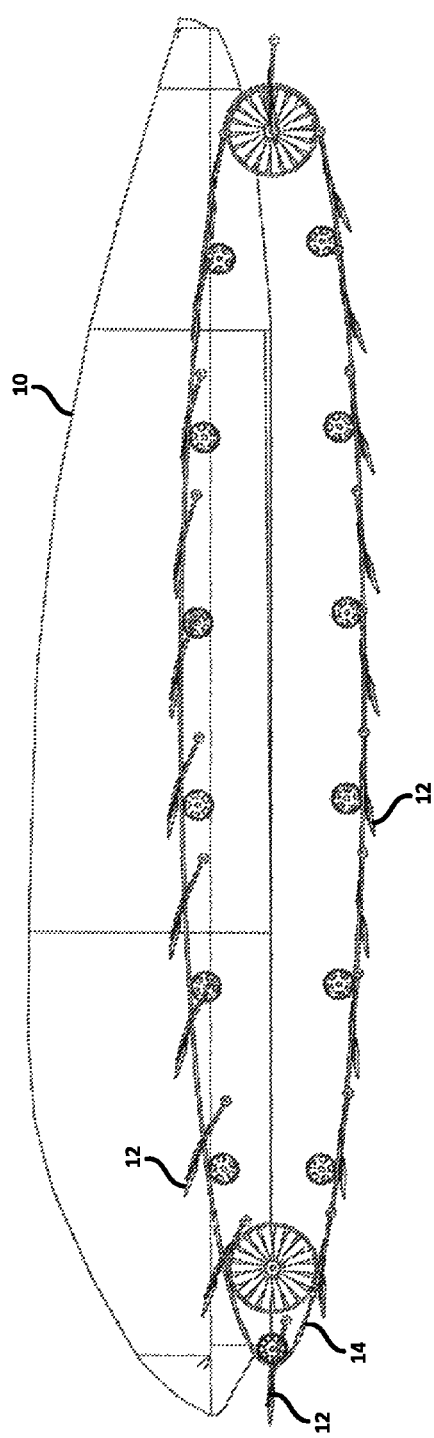
FIG. 19 is a side view of the craft of FIG. 1 with the elongated cone-shaped control track removed for clarity, showing blade foils in differential pitch angles for an upper forward blade foil group relative to the rest of the blade foil groups all along the other track portions of an LPM unit, resulting from a rotated position of the control loop unit as shown in FIG. 18 according to one embodiment.

FIGS. 18 and 19 show yet another configuration with regard to changes in vertical positioning of control units 15 relative to attachment points of blade foils 12. In this case, the forward ends and aft ends of control units 15 may be differentially raised and/or lowered relative to the attachment points of the blade foils 12, thereby causing iterations of control including nose high or low, aft high or low as well as twisting attitudes and flight patterns. According to embodiments and as shown in, for example, FIGS. 6 through 19, inwards and outwards movements of whole LPM assemblies 11 or ends of LPM assembly(ies) 11 as well as upwards and downwards movements may be smoothly combined with relative and/or whole craft power changes to bring about limitless continuums of configurations, craft attitudes (including stable upside down, right side up, along with permutations thereof) as well as various individual or combined movements including hovering, banking, twisting, pivoting horizontally and vertically, climbing, diving, forward, reverse, and sideways movements in a continuum of speeds in these individual or collective directions, or collections thereof, according to embodiments, and also compensate for load and trim factors of the craft, as desired.

FIGS. 20 and 21 are illustrations of a single LPM assembly 11 in two different configurations. FIG. 20 shows an LPM assembly 11 whose blade foils 12 may be provided with their leading edge high lift devices 22, such as automatically deploying slats, for example, and trailing edge high lift devices 23 arranged along the top portion of elongated loop path 13 of an LPM assembly 11 shown not deployed, and therefor in compact configuration, in short span, and in entirely swept leading edge configuration. Such a configuration may be suited to, for example, a high speed, low altitude flight mode. As also illustrated clearly in FIG. 20, in one embodiment, the blade foils 12 may be configured to present swept leading edges along the top portion of the elongated loop path 13 and a more perpendicular leading edge along the bottom portion of the elongated loop path 13 as leading edges are effectively exchanged as the blade foils transition from the upper portion to the lower portion of the elongated loop path 13. An additional configuration as illustrated in FIG. 21 shows these blade foils 12 in an extended span configuration, which maximizes surface area for increased lifting, propulsion and maneuvering capabilities as well as efficiencies associated with such increases in aspect ratios. Such a high aspect ratio configuration may be suited, for example, to high power, low speed flight mode (and may be well suited for lifting heavy loads) or for high altitude, high speed, high efficiency and low power flight modes. The blade foils 12 may be actuated and caused to assume these configurations in any number of ways. For example, internal pressure changes may be commanded by the pilot and/or programmatically, or such configurations may be effected automatically in response to ambient pressure changes with respect to internal pressures such as, for example, in lower pressure, high altitude conditions and/or during flights with additional low density altitude factors present.

According to one embodiment, one or more blade foils 12 may be removed as desired to adapt to certain conditions, such as reduced power availability. Conversely, according to one embodiment, blade foils 12 may be added. Such added blade foils 12 may be of the same or different specifications compared with the existing blade foils 12 at any point(s) along the elongated loop path 13.

Figure 22:
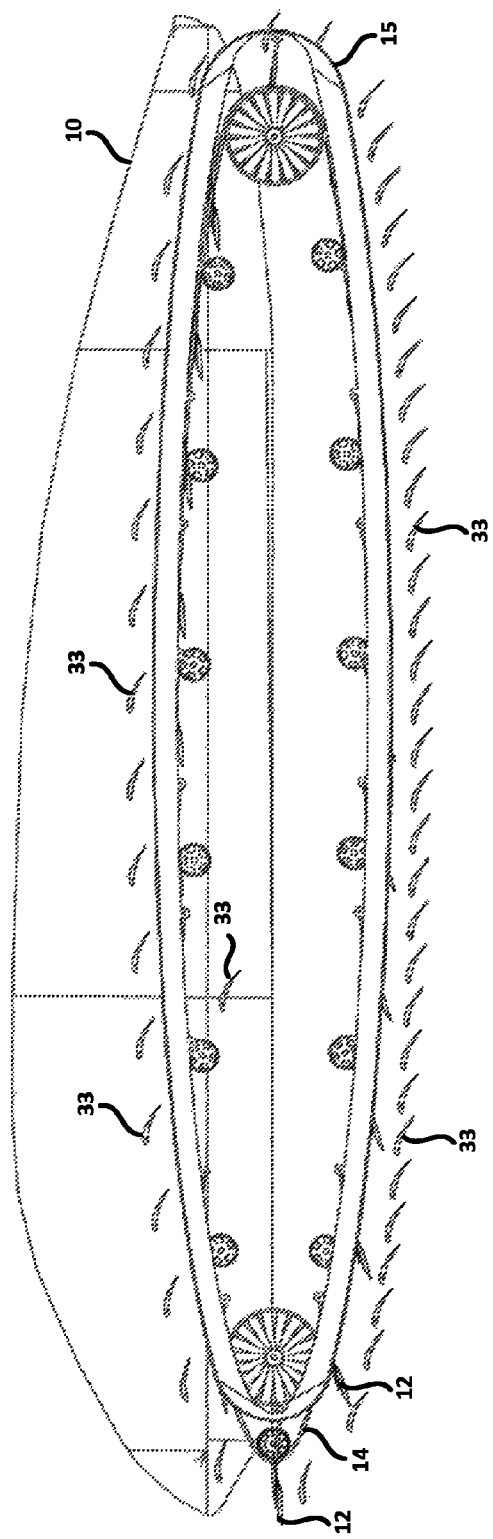
FIG. 22 is a side view of the craft of the present embodiments showing stator vanes over, between forward of, aft of and under blade foils, according to one embodiment.
Figure 23:
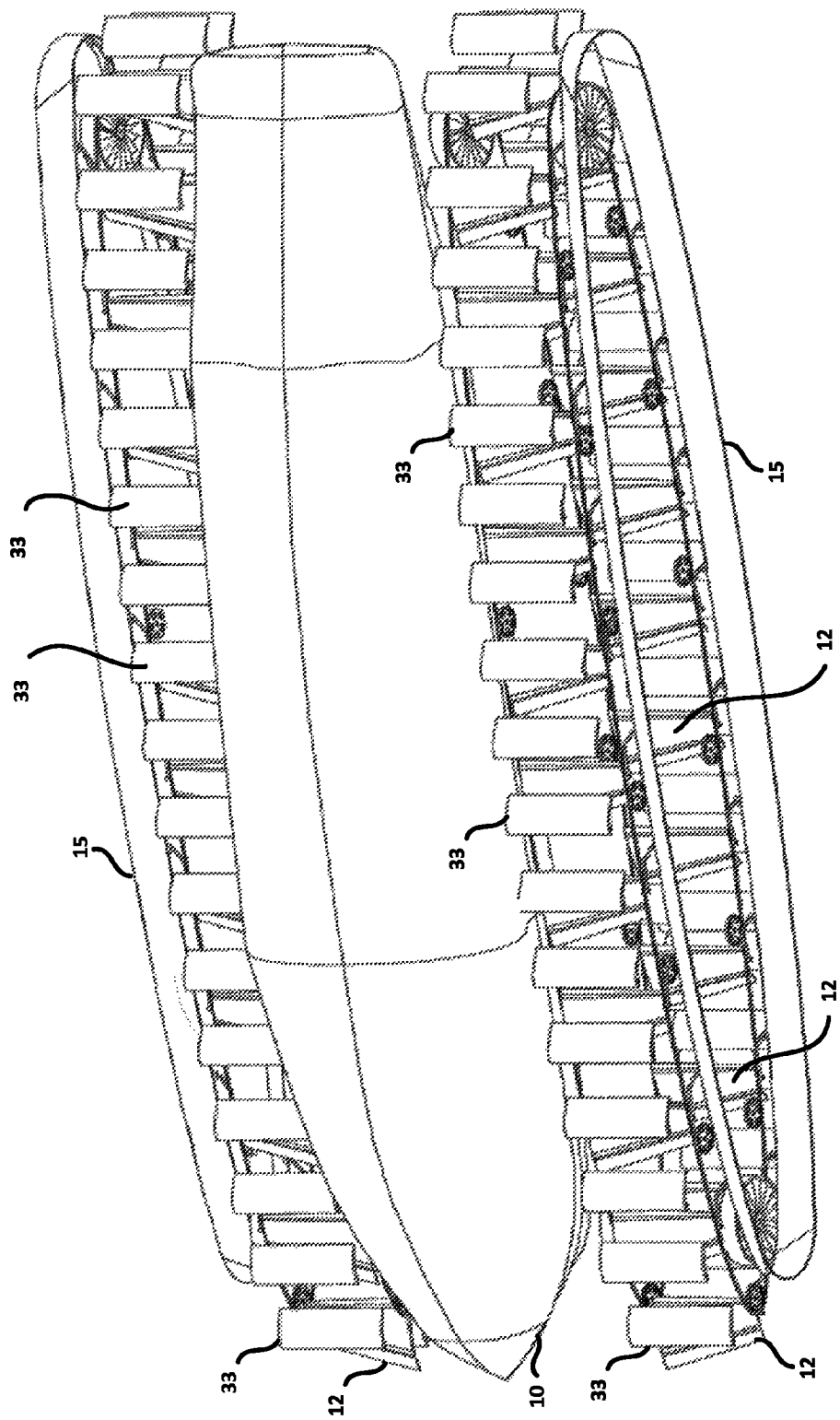
FIG. 23 is a perspective overhead view of the craft of FIG. 1 illustrating stator vanes, according to one embodiment.
Figure 24:
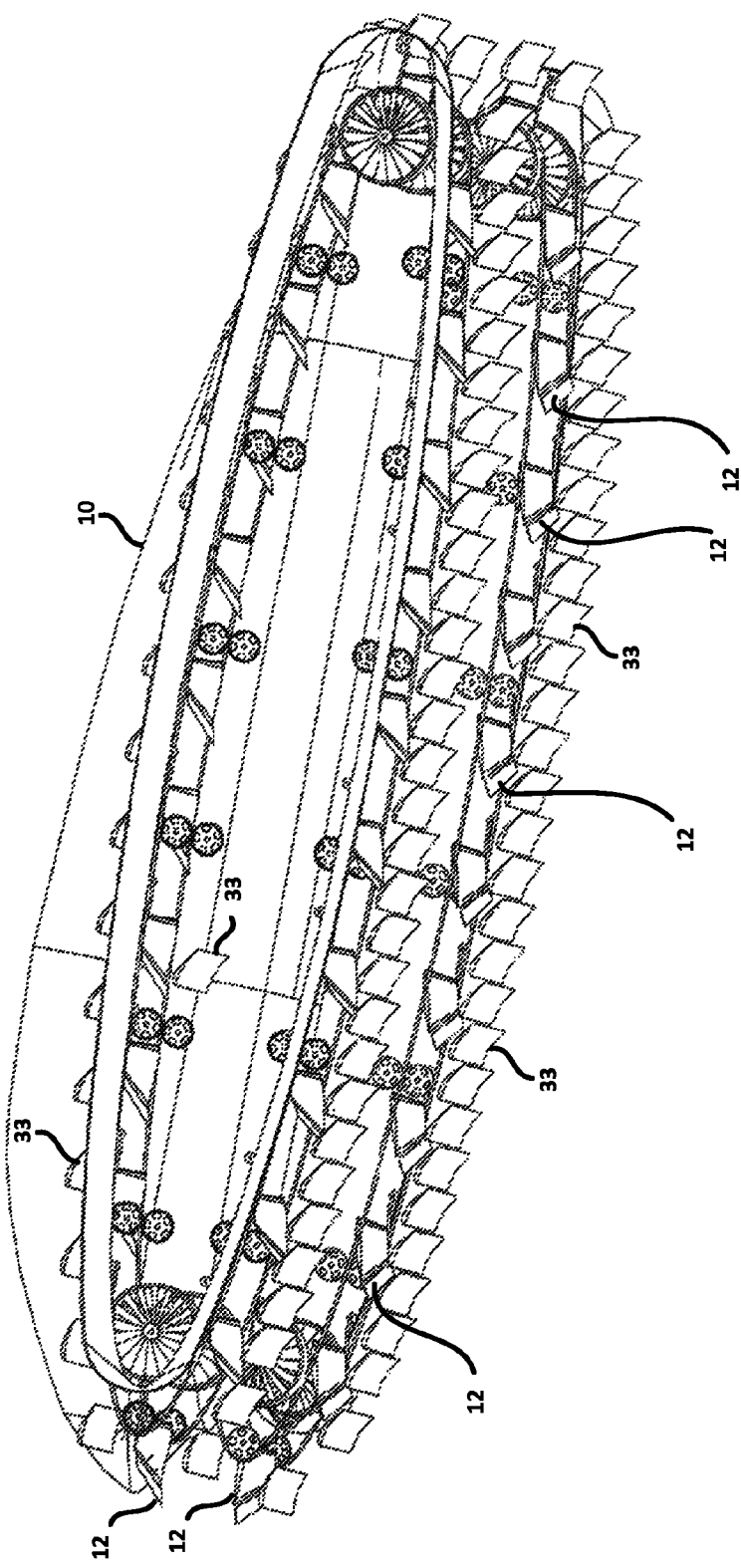
FIG. 24 is a perspective underside view of the craft of FIG. 1, illustrating stator vanes, according to one embodiment.

FIGS. 22 through 24 show one embodiment of a craft comprising stator vanes 33. Such stator vanes 33 are representative examples of flow directing devices that may be fixed or movable and that may be configured to confer protective shielding effects for moving components such as blade foils 12, control arms 20, control units 15 and driving tracks 14, as well as other supporting, driving and directing components. Such additional components may include, for example, longitudinal wings, ducts, skirts, fences and the like. Moreover, according to embodiments, devices such as endplates and winglet-type structures may be provided, either on or near the blade foils 12. The stator vanes 33 shown in FIGS. 22-24 may be provided and disposed above, below and between constituent structures of the LPM assemblies 11. The structure and emplacement of the stator vanes 33 in FIGS. 22-24 are shown according to anticipated flows. However, the angles thereof or any angles as shown in FIGS. 22-24 are not to be considered as limiting, as those of skill in this art may recognize that there are a wide variety in terms of numbers, shapes, orientations, locations and combinations of devices such as these that are enabled by compactness, configuration and proximity of LPM assemblies 11 with respect to the fuselage 10 of a craft according to embodiments. These stator vanes 33, which may be static or dynamically movable, as well as other aerodynamic components may direct flows to combat or neutralize recirculation, to optimize flows between upper and lower sections of LPM assemblies 11 and may also function to reduce noise, heat signature, turbulence, dust clouds and other unwanted conditions or byproducts. The stator vanes 33 may, according to one embodiment, be used for trimming purposes, for changing mission capabilities, efficiencies and for any other use, including countering of column settling and other ground effects encountered with low altitude hovering situations. The stator vanes 33 may also act as bumpers, may act as deflectors and/or may serve other safety needs including enabling flights right up to and even against fixed objects, including landing zones and structures. According to embodiments, the stator vanes 33 may also protect the moving elements of the craft from wildlife, wires and other encountered potentially hazardous objects and may also protect these elements from damage and/or destruction as a consequence of encountering another craft. Similarly, combinations of craft, either linked or independent of one another, according to embodiments herein may be used for joint accomplishment of certain missions, including coordinated lifting of objects, surveying or other missions.

Figure 25:
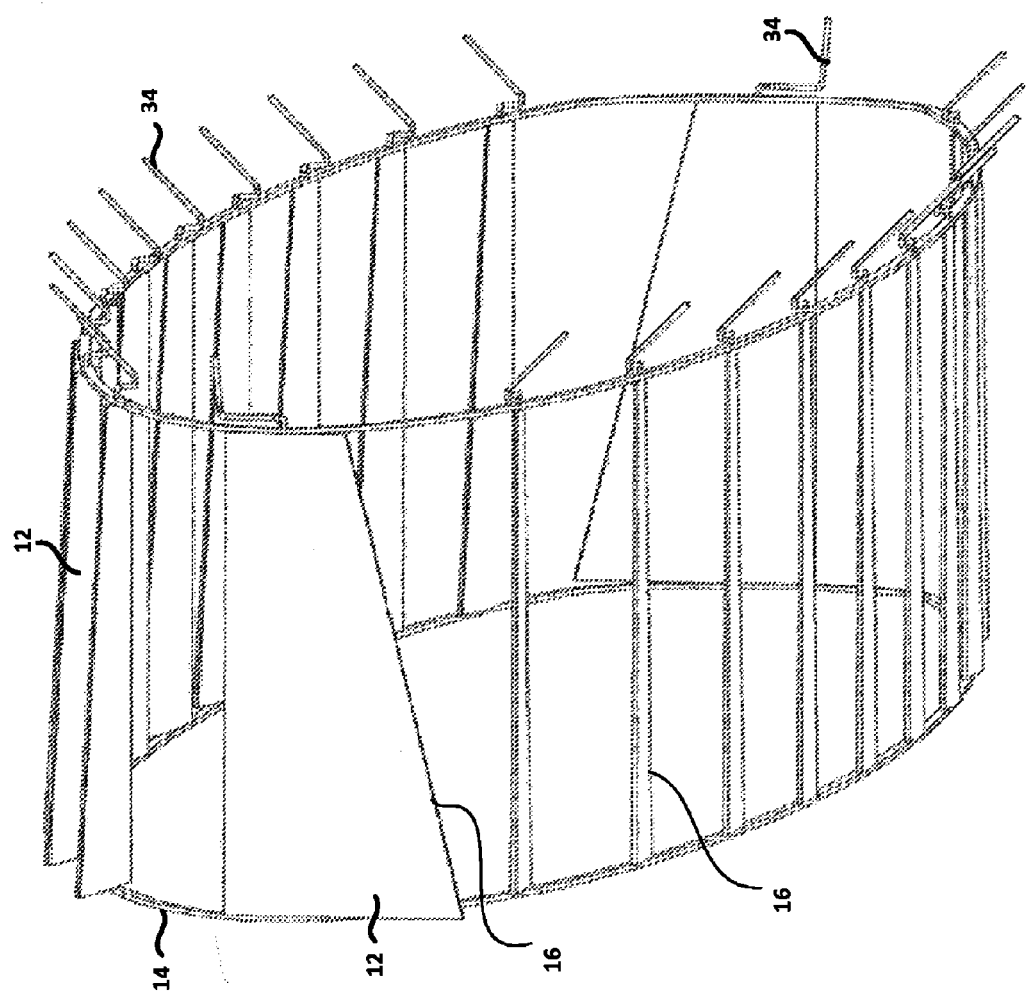
FIG. 25 is an underside perspective view of an alternate configuration of an LPM assembly showing drive track, blade foils with leading edges and control tines, according to one embodiment.
Figure 26:
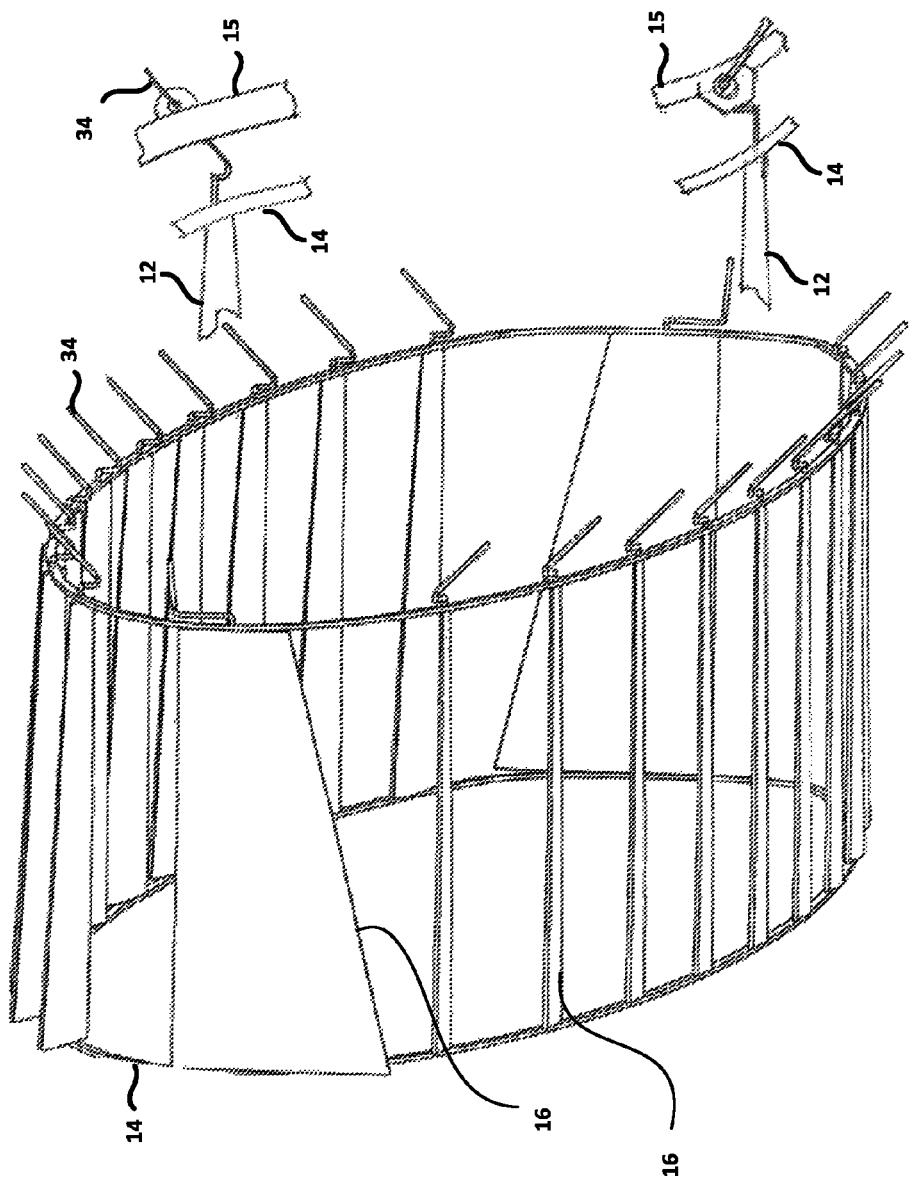
FIG. 26 is an underside perspective view of an alternate configuration of an LPM assembly showing drive track, blade foils with leading edges, and control tines, according to one embodiment. Also shown are partial upper and lower sections of control track, according to one embodiment.
Figure 27:
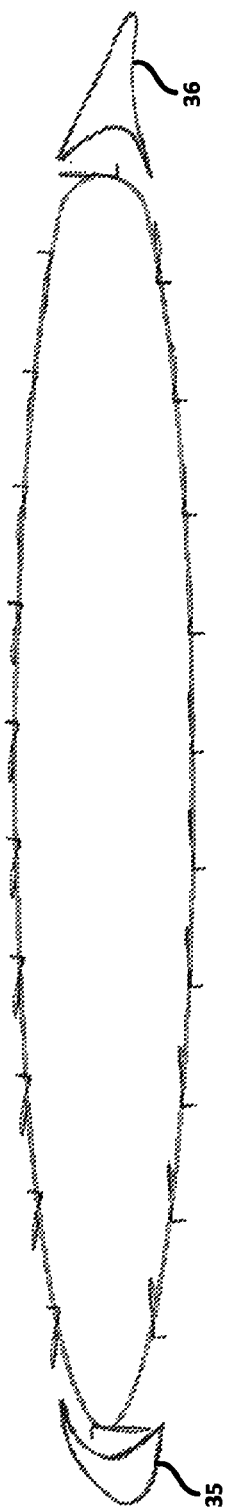
FIG. 27 is a side view line drawing of an alternate configuration of the LPM assembly of FIG. 25, showing forward fairing and aft fairing, according to one embodiment.
Figure 28:
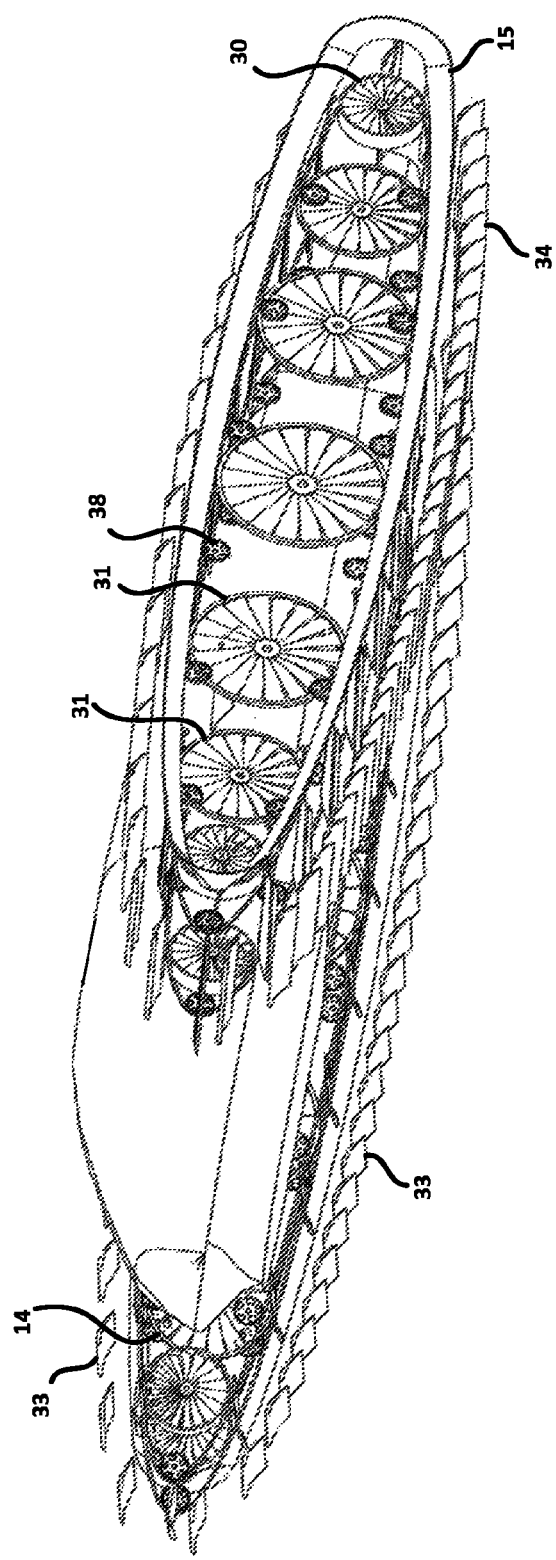
FIG. 28 is a side perspective view of a craft according to one embodiment showing drive wheels, fan driving wheels, idler wheels driving track, elongated cone-shaped control track and stator vanes, according to one embodiment.

FIG. 25 is an underside perspective view of an alternate configuration of an LPM assembly 11 showing drive track 14, blade foils 12 with leading edges 16 and control tines 34, according to one embodiment. FIG. 26 is an underside perspective view of such an alternate configuration of an LPM assembly 11 showing drive track 14, blade foils 12 with leading edges 16, and control tines 34, according to one embodiment. Also shown are partial upper and lower portions of elongated cone-effect control track, according to one embodiment. FIG. 27 is a side view line drawing of an alternate configuration of an LPM assembly 11 of FIG. 25, showing forward fairing 35 and aft 36 fairing, according to one embodiment. Indeed, FIGS. 25-27 show an alternative configuration for LPM assemblies 11 and controlling components for a craft according to embodiments, as well as fairings 35, 36 that find utility where the blade foils 12 may not be aligned with flows associated with forward and backwards flights, such as in transition zones at the forward and aft extremes of LPM assemblies 11. FIG. 25 shows blade foils 12 that, in contrast with other embodiments described and illustrated herein, do not trade leading edges for trailing edges as they circulate around elongated loop paths 13. Instead, in these configurations, the blade foils 12 maintain the same leading edges all the way around elongated loop paths 13, but may still be controlled similarly to other embodiments described herein. Significantly, however, upper surfaces of blade foils 12 positioned along upper segments of elongated loop path 13 become lower surfaces as they transition around to the lower portion of the elongated loop path 13. While this embodiment may be configured to maintain leading edges and trailing edges constant all the way around elongated loop path 13, this embodiment does not maintain alignment with relative flows and does not keep upper surfaces of the blade foils 12 on top and lower surfaces of the blade foils 12 on the bottom all the way around elongated loop paths 13. Control mechanisms may be slightly altered relative to other control mechanisms described and illustrated herein. According to one embodiment, a control mechanism may comprise angled control tines 34, which may be attached to controlling arms for each individual blade foil 12. The angled tines 34 may be made of or comprise lightweight materials and may be streamlined for minimal drag. As such, the control tines 34 may also serve as additional aerodynamic surfaces configured in winglet-type shapes.

According to one embodiment, a control method may comprise the control tines 34 interacting with constraining elongated loop paths 13 attached to a control belt unit 15, as described relative to other embodiments herein. According to one embodiment, moving the control belt 15 towards and away from blade foils 12 alters their respective pitch angles on the upper portions relative to the pitch angles of the blade foils 12 on lower portions of elongated loop path 13. Moving control belt 15 upwards and downwards with respect to the pivot points of blade foils 12 causes collective changes to the blade foils 12 along both top and bottom portions of elongated loop paths 13. Thus, in this configuration and according to one embodiment, moving control belts 15 closer and farther from blade foil anchoring points in drive track 14 result in effects similar to the effects previously described herein for another embodiment, which in that case results from moving control elements up and down relative to blade foil pivot points. In other words, the effects are similar for each embodiment, however moving control element in and out changes pitch in all blade foils in one embodiment while in the embodiment in FIG. 26, by virtue of leading edges remaining leading at all points around elongated loop path 13, moving control element in and outwards changes upper and lower blade foils differentially relative to one another. In the same way, elevating and lowering control units in the embodiments previously described herein cause differential pitch changes upper elongated loop path blade foils relative to lower elongated loop path blade foils, whereas in an embodiment of FIG. 27, these control element movements cause collective changes to all blade foil units on the upper as well as lower elongated loop path 13. According to one embodiment, these effects may easily be counteracted by changing where control tines 34 are located with respect to pivot points (shown at reference 27 in FIG. 37) of blade foils 12 such that the control anus are located near the leading edges 16 of blade foils 12 rather than near the trailing edges as they are shown in FIGS. 25, 26 and 27.

FIG. 27 shows examples of fairings 35, 36 at the forward end and aft end, respectively, of an LPM assembly 11 according to one embodiment. The fairings 35, 36 may be configured, according to one embodiment, to streamline the entire LPM assembly(ies) 11 by directing flows such that the entire LPM assembly 11 has a wing shape to augment lift and to shield the blade foils 12 in the transition areas where they are not aligned with incoming and exiting flows at the ends of LPM assemblies 11 during forwards and/or backwards flight directions. It should be noted that such fairings may be used with blade foil/LPM assembly configurations corresponding to either constant leading edge or changing leading edge with respect to the blade foils. According to one embodiment, the fairings 35, 36 may be movable (e.g., for controlling and/or trimming purposes) and additionally may be used as protective elements and as deflectors for wildlife, debris and structures that may be encountered during operations.

Figure 29:
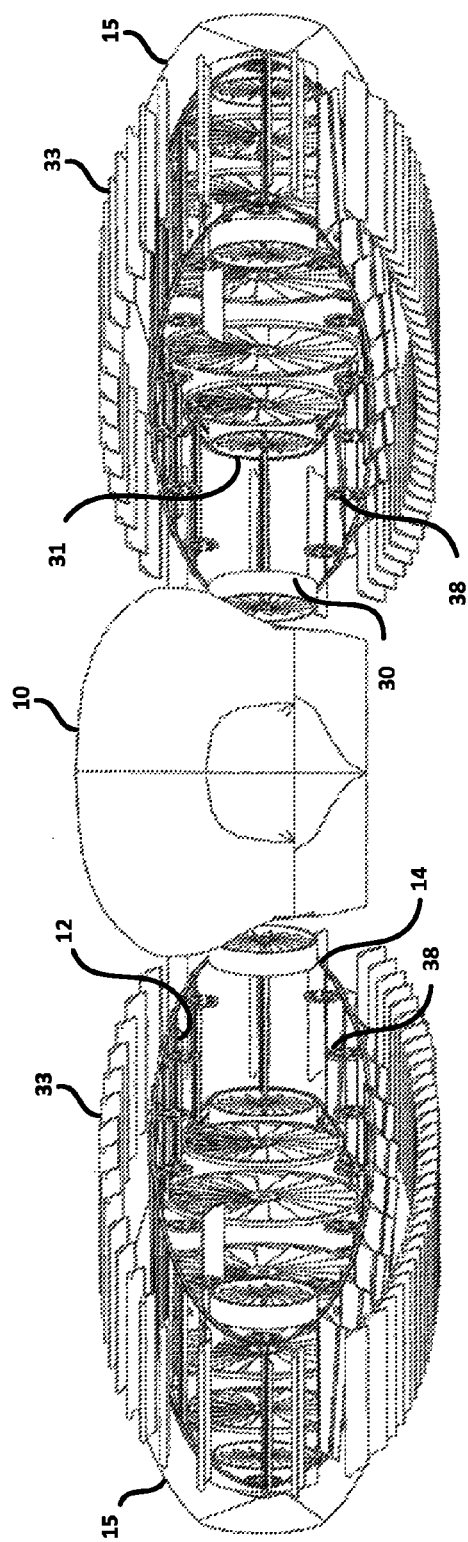
FIG. 29 is a front perspective of the craft of FIG. 1 showing fuselage and splayed out LPM assemblies, fan drive wheels, blade foils, stator vanes, drive wheels, idler wheels and elongated cone-shaped control tracks, according to one embodiment.
Figure 30:
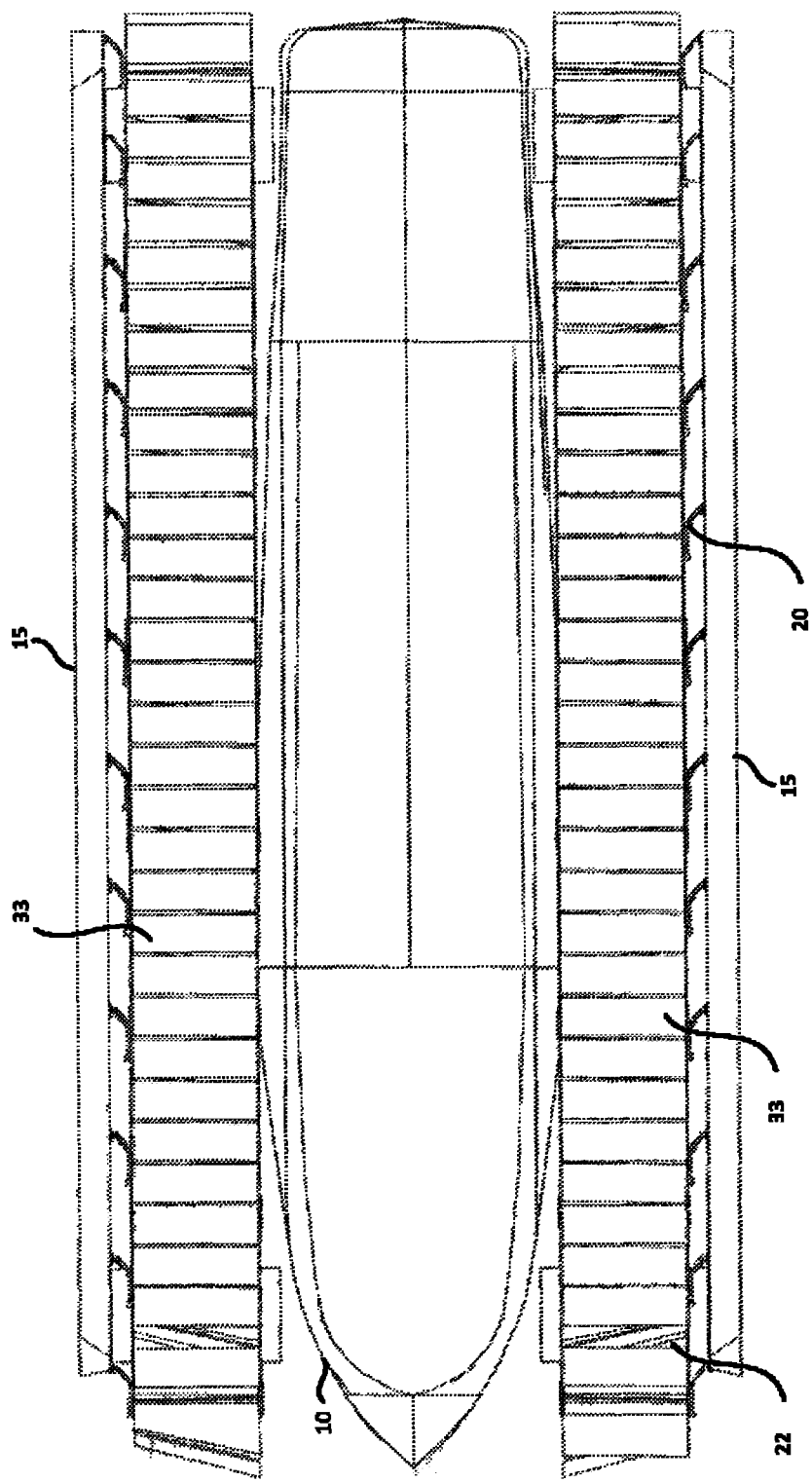
FIG. 30 is an overhead view of the craft of FIG. 1, showing fuselage, multiple protective stator vanes, upper track blade foils with leading edge slats, elongated cone-shaped control track, and control arms, according to one embodiment.

FIGS. 28 through 34 show embodiments in which entire LPM assembly(ies) 11 are configured to selectively move away from the fuselage 10 at a selectable angles. Embodiments may also utilize the driving track wheel elements as fans as shown at reference 31 to enhance flows while in normal position. Moreover, such driving track wheel elements 31 within the LPM assemblies 11 may be fully or partially aligned with the fuselage 10 in a "feathered" configuration, such that the driving track wheel elements 31 are configured as disc fences or airflow barriers that keep flows relatively confined within an LPM assembly 11 between upper and lower blade foils. The driving track wheel elements 31 may also be deployed as components of integrated power units such as turbofans where they may be configured as bypass fans by themselves or in conjunction with blade foils 12. FIG. 29 shows such fan elements located only on the outboard side of LPM assemblies with interspersed idler wheels 38. However, they may be located on the inboard side or both inboard and outboard areas, according to embodiments. As LPM assemblies 11 are further splayed outwards (for example) at the forward ends, the driving track wheel elements 31 may be exposed to flows associated with forward (and/or reverse) flight directions and may then take on additional propulsive roles as suggested in FIG. 29. Though LPM assemblies 11 are shown splayed outwards at the forward end of the craft shown in FIG. 28, they may also be splayed out at the aft end instead. Whether aft or forward, the degree to which the LPM assemblies 11 are splayed outwards may be different on the starboard side as on the port side, for a fine-grained control of drifting and for trimming for relative winds, for example, among a variety of useful functionalities. FIG. 30 is an overhead view of LPM assemblies 11 in position against a fuselage 10 prior to deployment outwards and also illustrates the effect of including multiple stator vanes 33, which leads to near complete protection of blade foils 12, according to embodiments.

Figure 31:
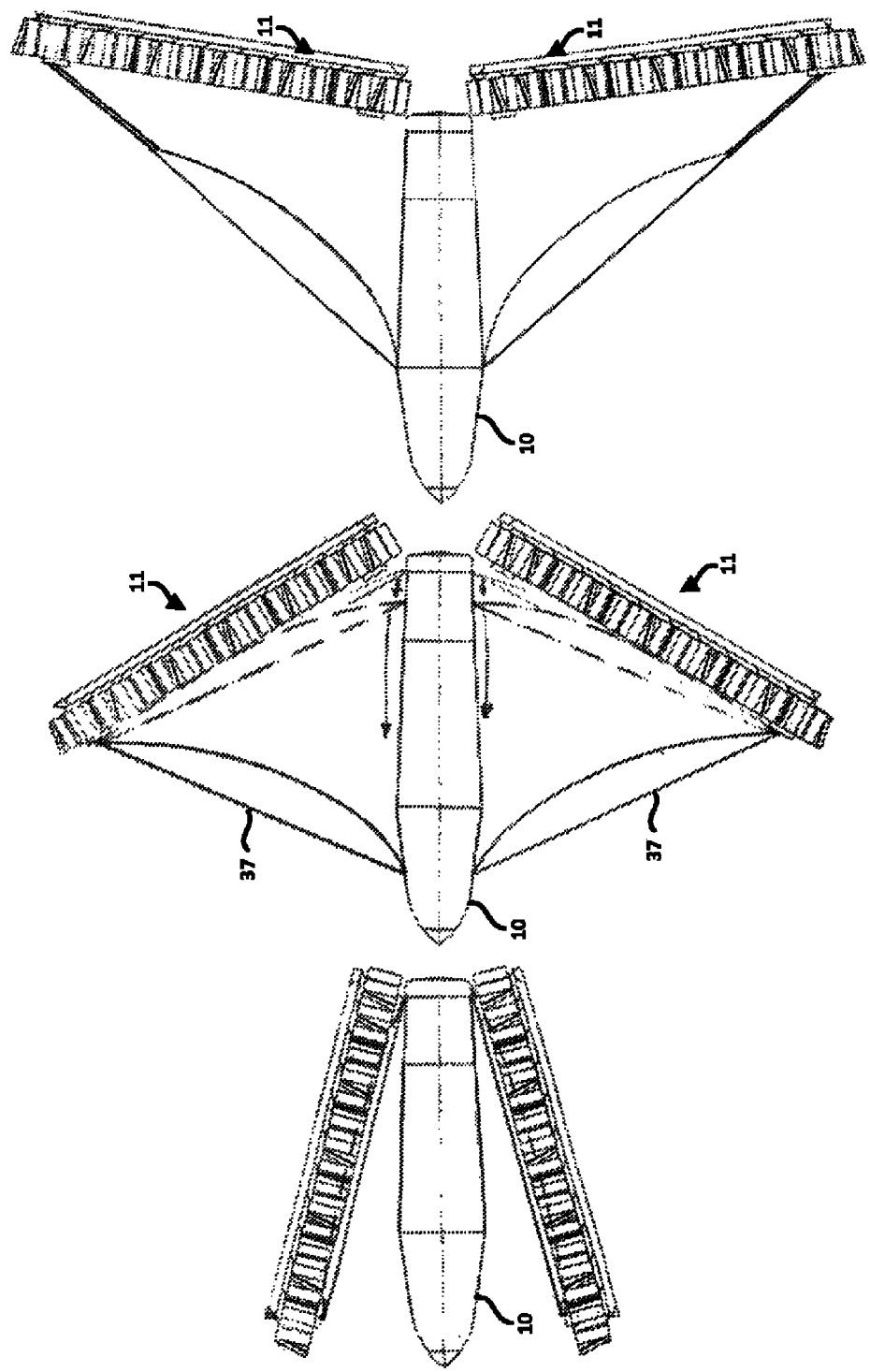
FIG. 31 are overhead views of the craft of the current embodiments showing deployment of movable wings in various positions as well as LPM assemblies in various positions, according to one embodiment.

FIG. 31 shows a craft according to one embodiment, comprising LPM assemblies 11 that are configured to symmetrically (or asymmetrically, to some extent) splay outwards at the forward ends. In the farthest left illustration, lift is accomplished almost entirely by LPM assemblies 11 along the entire length of the fuselage 10 with some possible contribution from fuselage flows, while propulsion is still directed aft by at least the blade foils 12 of the LPM assemblies with possible additional contributions from fan drive wheels 31, as described above. In the middle illustration, additional movable wing strut elements 37 (not necessarily drawn to scale) are exposed by virtue of their aft attachments sliding forwards. The illustration also shows how the movable wing strut elements 37 may be positioned to contribute significant lift, control and structural as well as aerodynamic stability, according to embodiments. The movable wing strut elements 37 are shown with "flaperons" 40 that are configured to have at least some of the functionality of both flaps and ailerons. In the far right illustration of FIG. 31, the movable wing strut elements 37 are shown to be both retracted slightly and extended in span such that LPM assemblies 11 are now in a position "over center" while the movable wing strut units 37 are shown in a highly swept configuration, which may be well suited to high speed flights, where at least a portion of the propulsion may be provided by fan drive wheels 31, while the blade foils 12 of the LPM assembly 11 may be configured to provide lift, directional control, and pitch control in conjunction with, or independently of, movable wing strut elements 37, according to embodiments.

Figure 32:
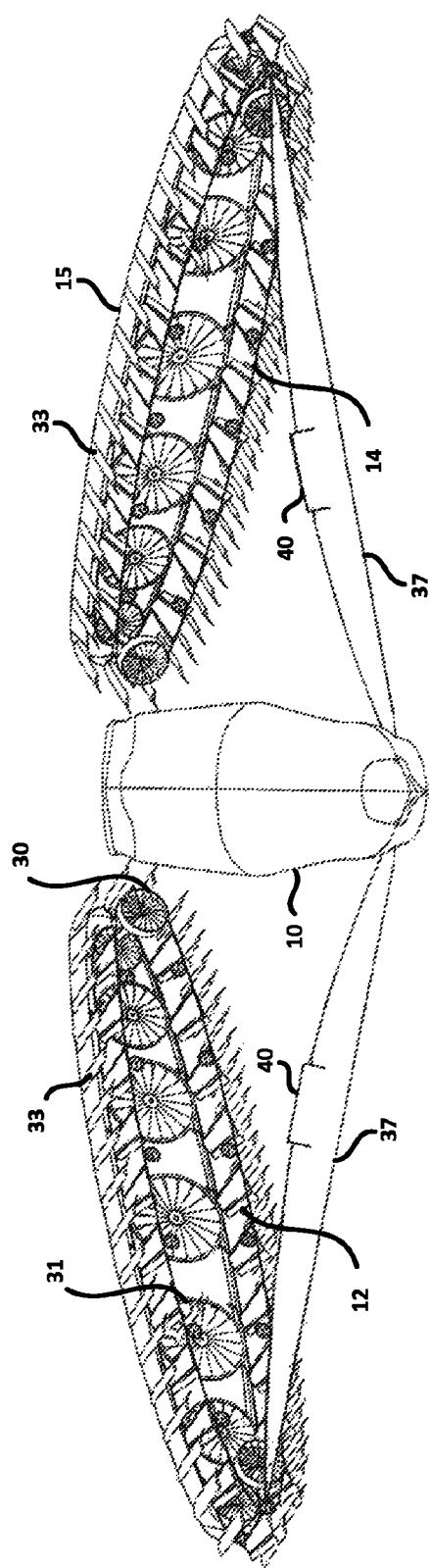
FIG. 32 is an overhead, viewing forward to aft perspective view of the craft of FIG. 1, showing movable wings, LPM assemblies with blade foils, stator vanes, drive tracks, fan drive wheels and wing flaperons, according to one embodiment.
Figure 33:
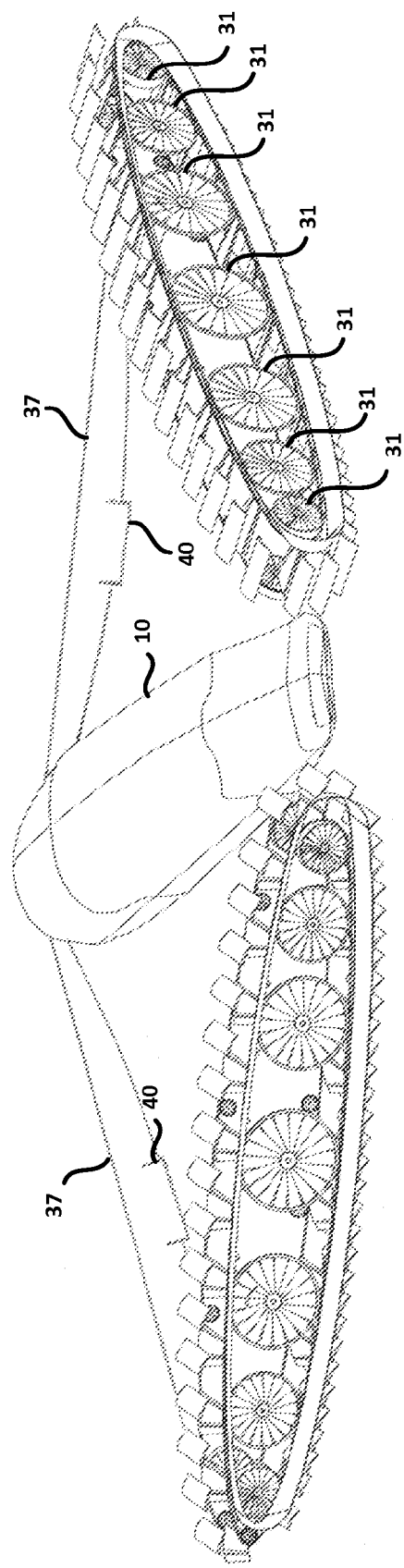
FIG. 33 is an overhead, viewing aft to forward perspective view of the craft of FIG. 1, showing movable wings, LPM assemblies with fan drive wheels and wing flaperons, according to one embodiment.
Figure 34:
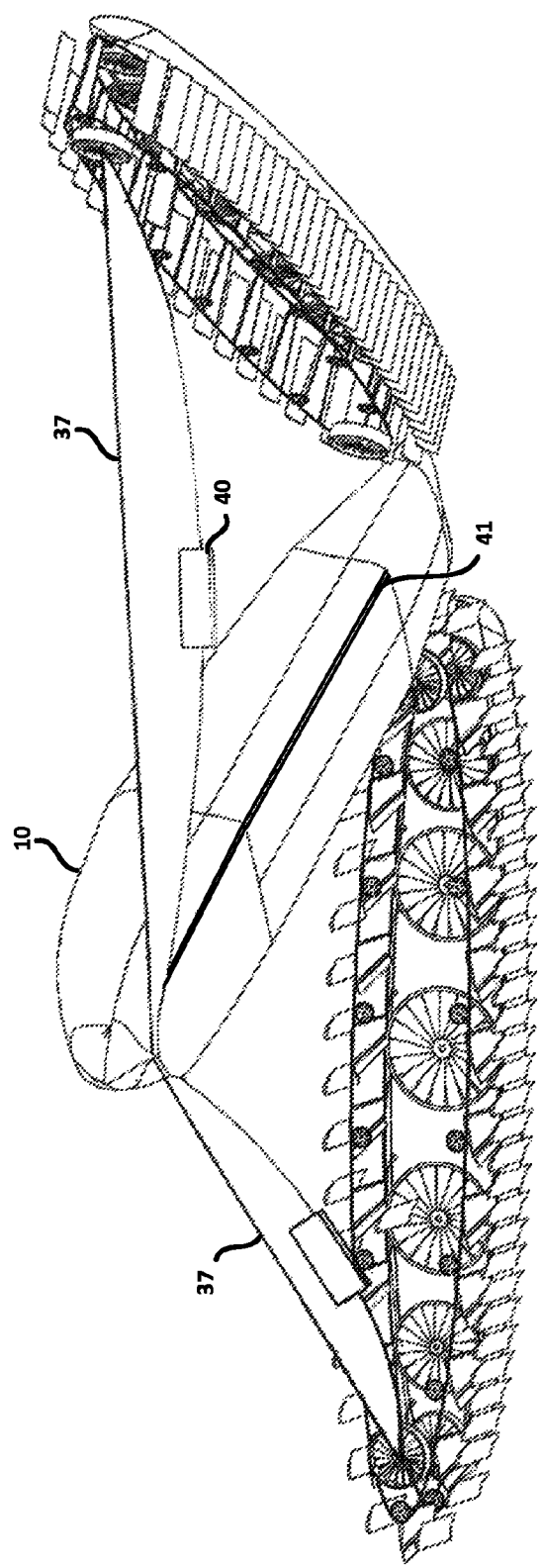
FIG. 34 is an underside perspective view of the craft of FIG. 1, showing wing extension track, movable wings, flaperons and fan drive wheels, according to one embodiment.

FIGS. 32, 33 and 34 show various perspective views of a craft according to one embodiment in which the LPM assemblies 11 may be spayed to a selectable degree. FIG. 34 shows one embodiment of such a craft comprising a slide track 41 along the lower side of fuselage 10 configured to enable the aft ends of the movable wing struts elements 37 to slide forward as LPM assemblies 11 are deployed outwards at the forward ends. Such a configuration according to one embodiment enables the movable wing strut elements 37 to gradually assume lift and control responsibility, particularly for forward loads while LPM assemblies 11 deploy, in effect, backwards relative to the craft's center of gravity. According to one embodiment, the movable wing strut elements 37 may be aligned with flow in their "tucked away" position along the side of fuselage 10 whether they are horizontally oriented or vertically oriented or somewhere in between.

Figure 35:
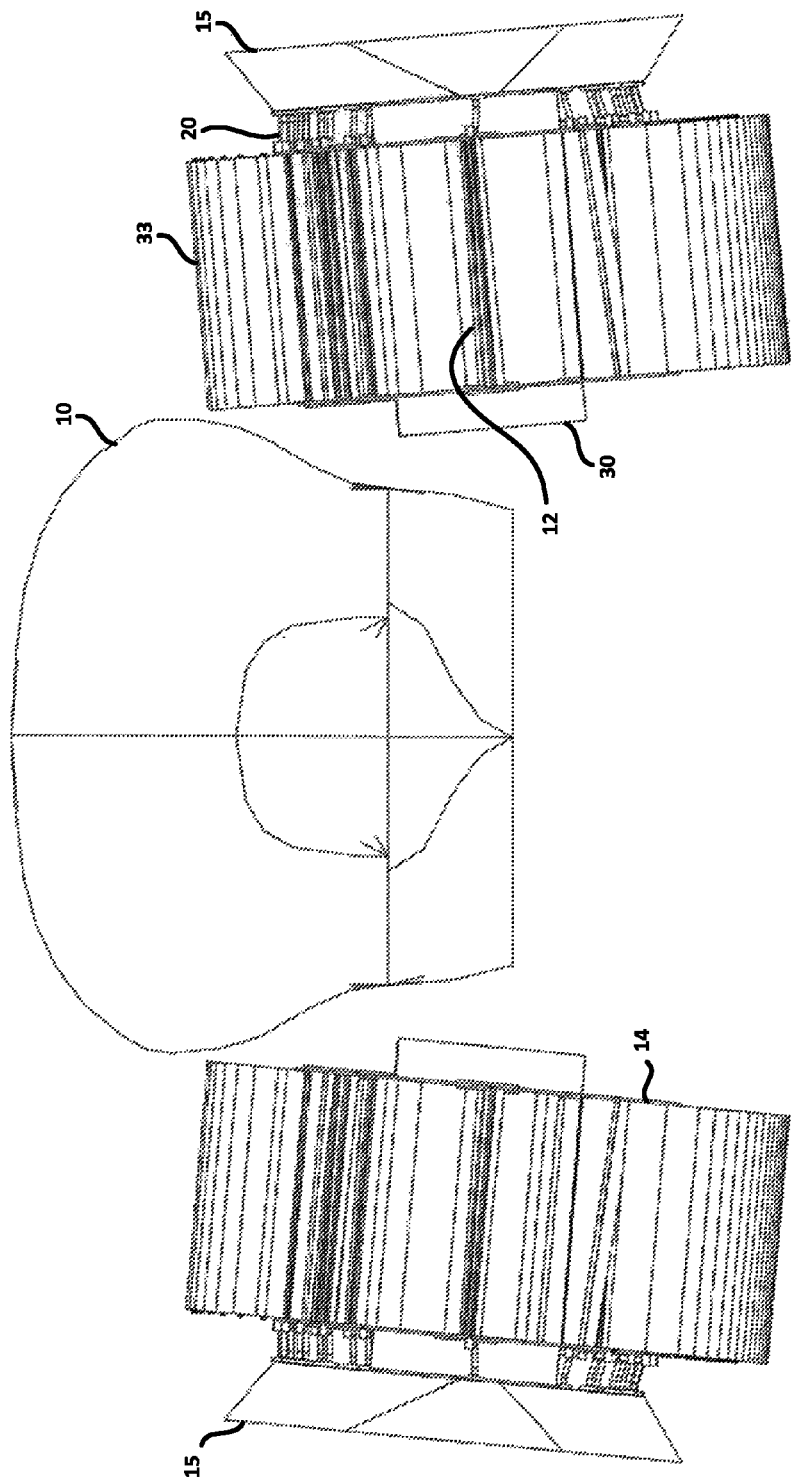
FIG. 35 is a front view of the craft of FIG. 1 showing fuselage, drive wheels, protective stator vanes, control arms, elongated cone-shaped control track, blade foils and drive tracks of bilateral LPM assemblies canted outboard at the bottom, according to one embodiment.

FIG. 35 illustrates one embodiment in which the LPM assemblies 11 may be canted, for example, LPM assemblies 11 outwards at the lower sides, away from fuselage 10. If symmetrically deployed, such canted LPM assemblies 11 may exhibit a substantial stabilizing effect on the craft. If controlled asymmetrically, such canted LPM assemblies 11 may combat drift, may be used for landing and/or takeoff from slopes and for standoff purposes when operating near structures. The canted LPM assemblies 11 may also combat recirculation and may direct flows away from occupants and/or structures on the ground, as may be desirable, for example, during emergency and/or rescue operations. Moreover, the canted LPM assemblies 11 may also find utility in directing flows to blow smoke, debris or other elements including liquids, gases, wildlife or others. Canting inwards at the bottom may be used to create an enhanced cushion, which when coupled with the flow skirts, fences, ducting structures, stator vanes of fixed or movable variety described herein, may be used to enhance low energy hovering and/or movement over surfaces such as ice, water sand and/or vegetation, while controlling dispersion of these elements as well as air thus accumulated. For example, such a capability may be well suited to landing operations as well as during transitional operations such as heavy lifting or transitioning to high-speed flights. Canting inwards or outwards at the topsides may produce similar and/or additional functionalities and are likewise within the scope of embodiments.

Figure 36:
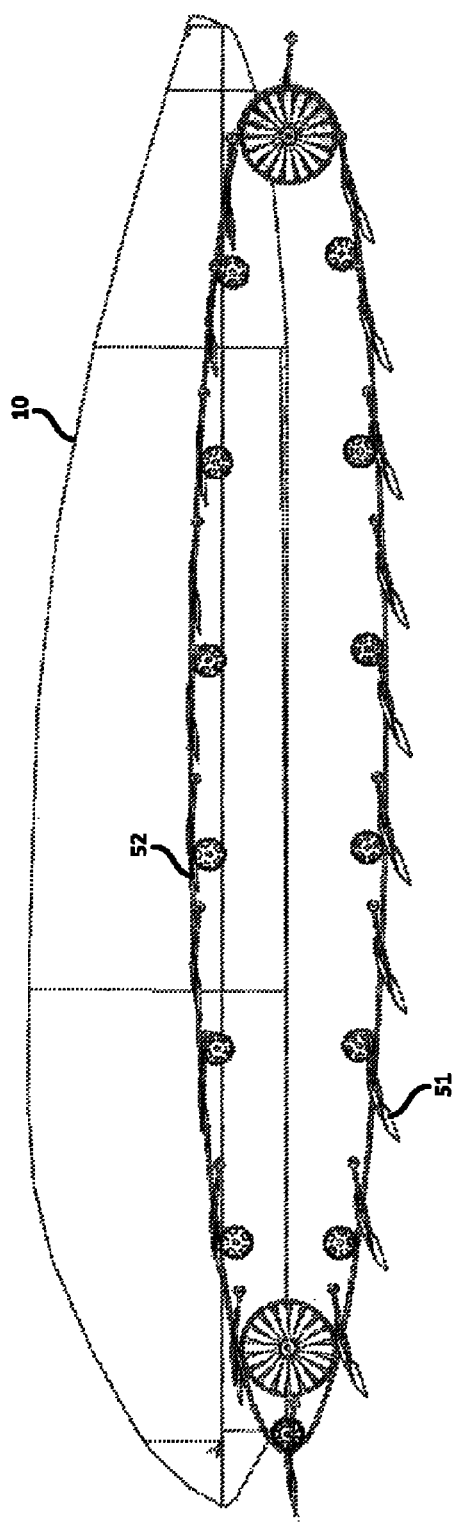
FIG. 36 is a side view of the craft of FIG. 1 with a physical control element not shown for clarity, showing a driving track, blade foils with thickened chords along bottom sections of an LPM assembly and blade foils with normal chords along top sections of an LPM assembly, according to one embodiment.
Figure 37:
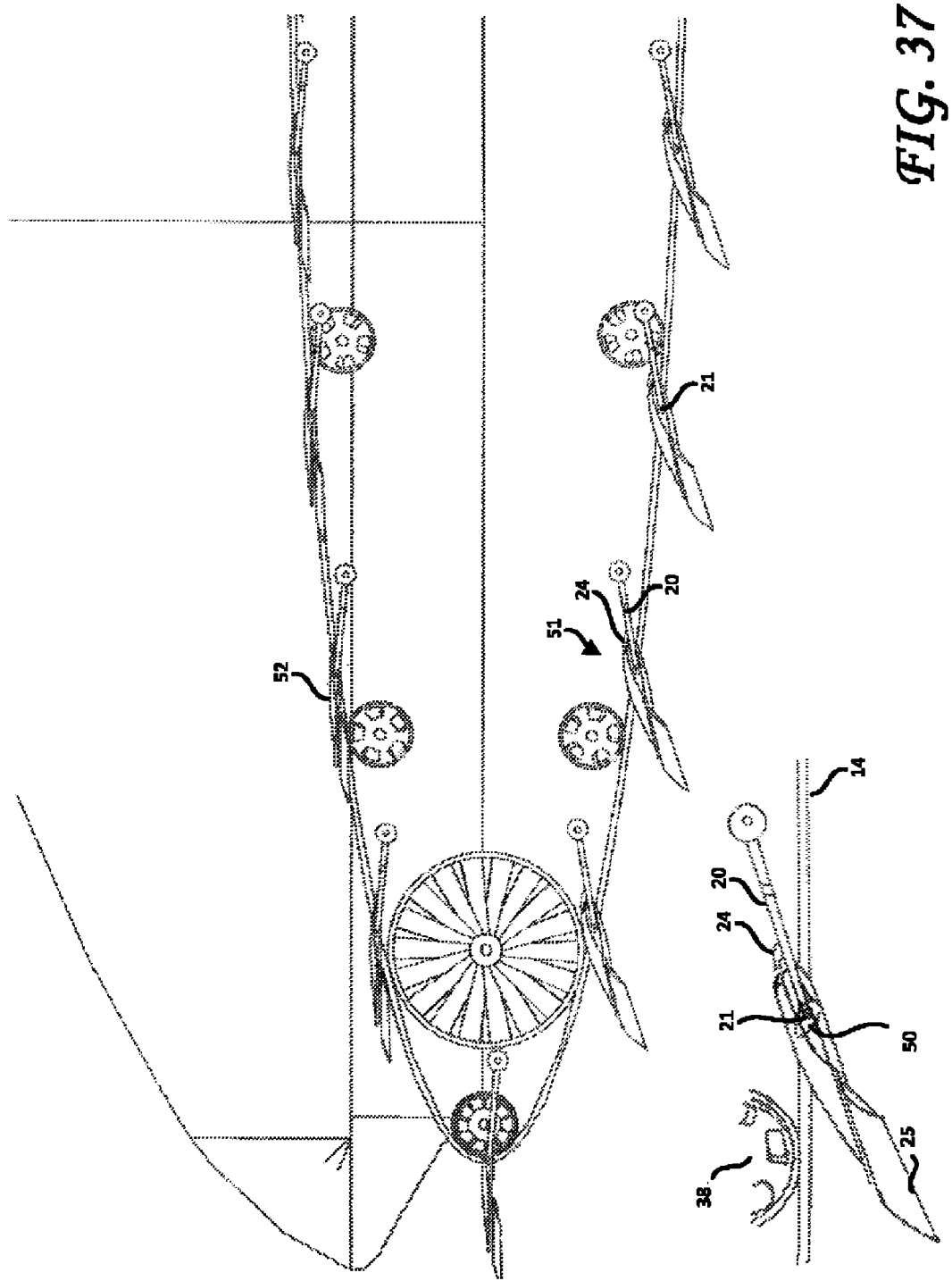
FIG. 37 is a closer-up view of a section of the craft of FIG. 1 with a control element removed for clarity, showing a drive track, blade foils with normal chord along top sections of an LPM assembly and blade foils with thickened chord along bottom sections of an LPU, according to one embodiment. Also shown is an enlarged view with control element removed for clarity, of a partial section of drive track, an idler wheel, control arm, blade foil with thickened chord, deployed leading edge slat, deployed trailing edge flap and camber cam, according to one embodiment.

FIGS. 36 and 37 show the dynamically configurable nature of the blade foils 12, according to embodiments. Such dynamic configurability may be effected on individual blade foils, on groups of blade foils (e.g., on the bottom portion of elongated loop path or on the top portion of elongated loop path 13 or segments of such portions) or among all blade foils 12 at once. FIGS. 36 and 37 illustrate changes to the chord thickness of the blade foils along the lower portion of elongated loop path 13 in a port side LPM assembly 11. In FIG. 36 blade foils 12 along the bottom portion of a port side LPM assembly 11 are noticeably thicker in chord relative to their counterparts along the top portion of the same LPM assembly 11, which illustrates the changes that occur as a result of changes to the pitch of the control arms affecting the cross section of the blade foils 12. This example utilizes changes to the pitch angle to also effect other changes that contribute to high lift and high propulsion, particularly in the instance where forward travel slows relative travel through the air of retreating blade foils 12 along the bottom portions of elongated loop path 13. It should be noted that blade foils 12 circulate from back to front along the top of an LPM assembly and front to back along the bottom of an LPM assembly in the illustrations included herein. For clarity, however it is to be understood that the direction of travel of the blade foils 12 may be reversed, without departing from the embodiments described and shown herein. FIG. 36 shows chord thickness changes with changes in pitch angles. However, other changes may occur based on positions of blade foils 12 along elongated loop paths 13. Other changes may include automatic or manual deployments of slats, flaps, fenestrations and the like, as well as geometric changes that may be caused to occur by changing the angle of attack relative to flows occurring along top and/or bottom portions of elongated loop paths 13. Some of these changes may be effected through changes in flow patterns as directed by movable stator vanes, among other possibilities.

FIG. 37 shows further details of one embodiment, in which changes to blade foils changes may be effected by mechanical component. As shown, a camber adjusting cam 50 may be affixed to a control arm 20 to increase chord thickness when the eccentric shape of the camber adjusting cam 50 wedges against internal surfaces of a blade foil 12, which also creates a sliding of upper versus lower surfaces of blade foil 12. Such sliding motion may deploy leading edge slats 24, trailing edge flaps 25 and/or may expose openings creating the functional deployment of such high-lift devices. Likewise, other high-lift configurations may be deployed, such as openings to enable higher angle of attack of retreating blade foils while energizing upper surface airflow to prevent and/or delay stagnation, turbulence, loss of laminar flows and stalling of individual and/or groups of blade foils, according to embodiments.

A craft, according to embodiments, may be configured to move through a fluid medium. The fluid medium may comprise, for example, air or water. The craft may be configured as a heavier than air craft. Alternatively, the craft may be configured to be lighter than air, by fitting the craft with, e.g., helium gas-filled compartments. In such a case, the LPM assemblies 11 may be principally configured for maneuvering and propulsion.

The craft, according to embodiments, may be configured with mechanical linkages between a control yoke and the LPM assemblies 11. Alternatively and according to one embodiment, the coupling may comprise a fly-by-wire system. The craft may be configured to be autonomously or remotely-piloted. The craft may be configured, therefore, as a piloted craft or as a remotely piloted, semi-autonomous or fully autonomous drone. The present embodiments, its components and methods of use may be used separately or in any number of combinations with each other. Likewise, individually or in combination with each other, many of the components and methods may be used in numerous applications beyond the described primary use of highly maneuverable flight, including vertical takeoff and landing. For example, the components, subassemblies, control systems, aerodynamic systems, methods of powering and adaptive control using power direction alone and/or in combination with aerodynamic surfaces described and shown herein may be readily applied, as described herein or modified, to applications other than flight.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A craft, comprising:
   fuselage;
   a first lifting assembly coupled to the fuselage, comprising at least one blade foil, the at least one blade foil being configured to travel around an elongated loop path to provide lift to the fuselage,
   wherein the elongated loop path comprises a first portion and a second portion and wherein a leading edge of the at least one blade foil travelling along the first portion of the elongated loop path becomes the trailing edge as the at least one blade foil travels along the second portion of the elongated loop path.

2. The craft of claim 1, wherein the lifting assembly is further configured to provide maneuvering and propulsion.

3. The craft of claim 1, wherein the lift is provided in a fluid comprising one of air and water.

4. The craft of claim 1, wherein at least one of a pitch and, a chord of the at least one blade foil is configured to be dynamically controllable as the at least one blade foil travels along the elongated loop path.

5. The craft of claim 1, wherein the first lifting assembly is coupled to one side of the fuselage and wherein the craft further comprises a second lifting assembly coupled to another side of the fuselage.

6. The craft of claim 5, wherein each of the first and second lifting assemblies are independently controllable and nimble relative to the fuselage.

7. The craft of claim 1, wherein the first lifting assembly is configured such that the at least one blade foil is coupled to the fuselage by a control assembly configured to control a configuration of the at least one blade foil as it travels around the elongated loop path.

8. The craft of claim 7, wherein the control assembly comprises, for each of the at least one blade foil, a control arm configured to change at least one of a chord and a pitch of the blade foil to which the control arm is coupled.

9. The craft of claim 8, wherein the control assembly comprises an elongated cone-shaped control track defining a curvature that is followed by each control arm.

10. The craft of claim 9, wherein the control assembly is configured to move the control track in all directions about x, y and z axes and wherein the control assembly is configured to control at least of the chord and pitch of each blade foil by selectively moving the control track along the x, y and z axes thereof.

11. The craft of claim 1, wherein the elongated loop path is ovaloid-shaped.

12. A craft, comprising:
    a fuselage;
    a first lifting, propulsion and maneuvering (LPM) assembly coupled to one side of the fuselage, comprising a first elongated cone-shaped control assembly with angled control elements a plurality of first blade foils, each of which being coupled to the first control assembly by respective control arms and configured to travel around a first elongated loop path, a configuration of the first blade foils being controllable as the control arms follow a curvature of the first control assembly as the first blade foils travel around the first elongated loop path.

13. The craft of claim 12, further comprising a second LPM assembly coupled to another side of the fuselage, comprising a second elongated cone-shaped control track or control belt with angled control elements, a plurality of second blade foils, each of which being coupled to the control assembly by respective control arms and configured to travel around a second elongated loop path, a configuration of the second blade foils being controllable as the control arms follow a curvature of the second control assembly as the second blade foils travel around the second elongated loop path.

14. The craft of claim 13, wherein the first and the second LPM assemblies are configured to be independently movable relative to the fuselage.

15. The craft of claim 12, wherein the controllable configuration of the first blade foils comprises at least one of a pitch and a chord of the first blade foils.

16. The craft of claim 12, wherein the first LPM assembly is configured to be movable relative to the fuselage in all directions along x, y and z axes.

17. The craft of claim 12, further comprising, for each of the first blade foils, a control arm configured to follow a curvature of the first control assembly to control the configuration of the first blade foils.

18. The craft of claim 12, wherein a configuration of individual ones, groups of or all of the first blade foils are independently controllable.

19. The craft of claim 12, wherein the first elongated loop path comprises a first portion and a second portion and wherein leading edges of the first blade foils travelling along the first portion of the first elongated loop path become trailing edges as the first blade foils travel along the second portion of the first elongated loop path.

20. The craft of claim 12, wherein the first elongated loop path comprises a first portion and a second portion and wherein leading edges of the first blade foils travelling along the first portion of the first elongated loop path are maintained as leading edges as the first blade foils travel along the second portion of the first elongated loop path.

21. The craft of claim 12, configured to operate in a fluid medium comprising one of air and water.

22. The craft of claim 12, wherein the first elongated loop path is ovaloid-shaped.

23. A method of moving a craft through a fluid medium, comprising:
moving a plurality of first blade foils along a first elongated loop path defined adjacent a first side of a fuselage;
moving a plurality of second blade foils along a second elongated loop path defined adjacent a second side of the fuselage; and
controlling at least one of a movement and attitude of the craft by controlling a configuration of the first and second blade foils.

24. The method of claim 23, wherein the first blade foils are disposed around the first elongated, loop path such that each leading edge of the first blade foils is adjacent to and substantially parallel with a trailing edge of a next adjacent first blade foil.

25. The method of claim 23, wherein moving comprises causing leading edges of the first and second blade foils travelling, along first portions of the first and second elongated loop paths, respectively, to become trailing edges as the first and second blade foils travel along second portions of the first and second elongated loop paths, respectively.

26. The method of claim 23, wherein moving comprises maintaining leading edges of the first and second blade foils travelling along first portions of the first and second elongated loop paths, respectively, as leading edges as the first and second blade foils travel along second portions of the first and second elongated loop paths, respectively.

27. The method of claim 23, wherein controlling comprises controlling at least one of a pitch and chord of the first and second blade foils.

28. The method of claim 23, wherein controlling comprises independently controlling a configuration of groups or individual ones of the first and second blade foils.

29. The method of claim 23, wherein controlling comprises causing respective first control arms of the first blade foils to follow a first elongated cone-shaped control assembly with angled control elements disposed on the first side of the fuselage and causing second respective control arms of the second blade foils to follow a second elongated cone-shaped control assembly with angled control elements disposed the second side of the fuselage.

30. The method of claim 23, wherein controlling comprises comprise controlling the configuration of the first blade foils independently of the configuration of the second blade foils.

31. The method of claim 23, wherein controlling comprises:
controlling the first blade foils to assume first configurations while travelling along a first portion of the first elongated loop path and to assume second configurations while travelling along a second portion of the first elongated loop path; and
controlling the second blade foils to assume first configurations while travelling along a first portion of the second elongated loop path and to assume second configurations while travelling along a second portion of the second elongated loop path.

32. The method of claim 23, wherein the first blade foils form part of a first lifting, propulsion and maneuvering (LPM) assembly coupled to the first side of the fuselage and wherein the second blade foils form part of a second LPM assembly coupled to the second side of the fuselage, and wherein controlling comprises controlling a position and orientation of each of the first and second LPM assemblies relative to the fuselage.

33. The method of claim 32, wherein controlling comprises controlling the first and second LPM assemblies independently of one another.

* * * * *